(12) United States Patent
Kim et al.

(10) Patent No.: US 9,642,125 B2
(45) Date of Patent: May 2, 2017

(54) METHOD FOR TRANSCEIVING DATA IN WIRELESS ACCESS SYSTEM AND TERMINAL THEREFOR

(75) Inventors: Jinmin Kim, Anyang-si (KR);
Seunghee Han, Anyang-si (KR);
Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 143 days.

(21) Appl. No.: 14/124,352

(22) PCT Filed: Jun. 18, 2012

(86) PCT No.: PCT/KR2012/004794
§ 371 (c)(1),
(2), (4) Date: Dec. 6, 2013

(87) PCT Pub. No.: WO2012/173445
PCT Pub. Date: Dec. 20, 2012

(65) Prior Publication Data
US 2014/0105158 A1    Apr. 17, 2014

Related U.S. Application Data

(60) Provisional application No. 61/497,957, filed on Jun. 17, 2011.

(51) Int. Cl.
*H04L 1/18*      (2006.01)
*H04L 5/00*      (2006.01)
(Continued)

(52) U.S. Cl.
CPC ............ *H04W 72/042* (2013.01); *H04L 1/001* (2013.01); *H04L 1/0004* (2013.01);
(Continued)

(58) Field of Classification Search
CPC ....... H04L 5/0053; H04L 1/00; H04L 1/0004; H04L 1/001; H04L 5/001; H04L 5/0023;
(Continued)

(56) References Cited

U.S. PATENT DOCUMENTS

| 8,644,361 B2 * | 2/2014 | Ogawa | H04J 11/0023 370/500 |
| 8,923,223 B2 * | 12/2014 | Chen | H04L 1/1607 370/329 |
| 9,019,982 B2 * | 4/2015 | Nishio et al. | 370/436 |

FOREIGN PATENT DOCUMENTS

| KR | 1020090043434 A | 5/2009 |
| KR | 102009111250 A | 10/2009 |
| KR | 1020110013336 A | 2/2011 |

* cited by examiner

*Primary Examiner* — Ayaz Sheikh
*Assistant Examiner* — Debebe Asefa
(74) *Attorney, Agent, or Firm* — Dentons US LLP

(57) ABSTRACT

The present invention relates to a method for transmitting and receiving data in a wireless access system and a terminal therefor. The method comprises the steps of: receiving an instruction message which instructs transmission of uplink resource allocation information via a physical downlink shared channel (PDSCH) from a base station; determining whether the resource allocation information is a first downlink resource allocation information based on the instruction message, upon receiving resource allocation information set to a flag value that indicates uplink resource allocation information, from the base station via a physical downlink control channel (PDCCH); receiving uplink resource allocation information via the PDSCH according to the first downlink resource allocation information from the base station; and transmitting uplink data to the base station via a physical uplink shared channel (PUSCH) according to the uplink resource allocation information.

16 Claims, 15 Drawing Sheets

(51) Int. Cl.
*H04L 1/00* (2006.01)
*H04W 52/14* (2009.01)
*H04W 72/04* (2009.01)

(52) U.S. Cl.
CPC .......... *H04L 1/0038* (2013.01); *H04L 1/1854* (2013.01); *H04L 1/1887* (2013.01); *H04L 5/0053* (2013.01); *H04W 52/146* (2013.01)

(58) Field of Classification Search
CPC .. H04L 1/1887; H04L 1/1854; H04W 72/042; H04W 72/12; H04W 52/146
See application file for complete search history.

FIG. 4
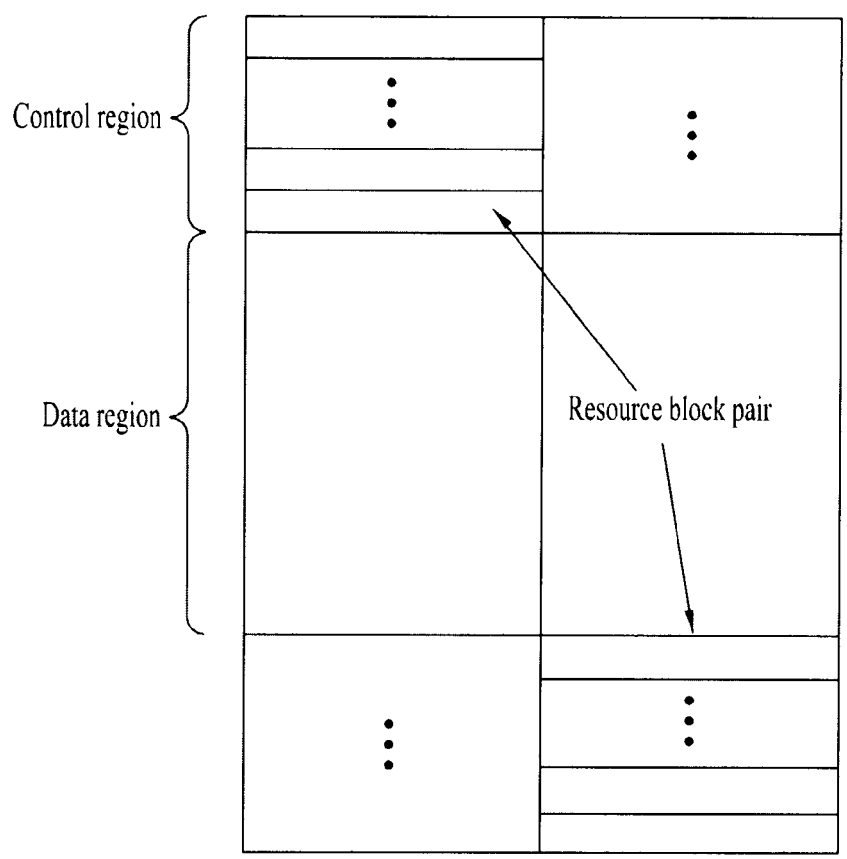
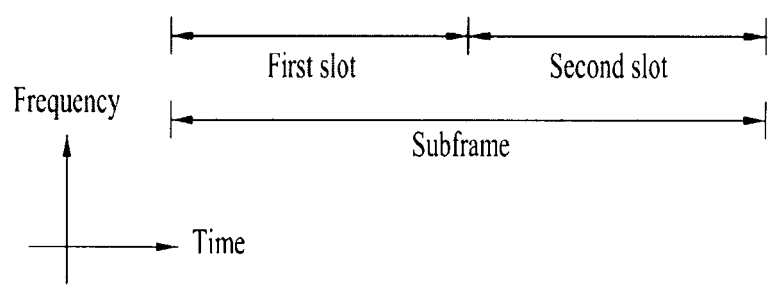

METHOD FOR TRANSCEIVING DATA IN WIRELESS ACCESS SYSTEM AND TERMINAL THEREFOR

This application is a 35 USC §371 National Stage entry of International Application No. PCT/KR2012/004794 filed Jun. 18, 2012, and claims priority of U.S. Provisional Application No. 61/497,957 filed on Jun. 17, 2011, each of which is hereby incorporated by reference in its entirety.

TECHNICAL FIELD

The present invention relates to a wireless access system, and more particularly, to a method of transmitting and receiving data to perform a radio resource scheduling between a base station and a user equipment in a wireless access system and apparatus therefor.

BACKGROUND ART

One of the most significant requirements for the next generation wireless access system is the capability of supporting the high data rate requisite. To this end, many ongoing efforts are made to research and develop various technologies including MIMO (multiple input multiple output), CoMP (cooperative multiple point transmission), relay and the like.

In a wireless access system according to a related art, even if an uplink (UL) and a downlink (DL) are set to differ from each other in bandwidth, a single carrier is mainly taken into consideration. For instance, a wireless communication system having UL and DL carriers, each of which number is 1, and UL and DL bandwidths generally symmetric to each other is provided based on a single carrier.

Yet, considering the situation that frequency resources are saturated, as a method of securing broadband bandwidths to meet the higher data transmission rate requirements, CA (carrier aggregation/multiple cells) is introduced in a manner of designing each of scattered bandwidths to operate an independent system and aggregating a plurality of bands into a single system.

In this case, a carrier of an independently operable bandwidth unit is called a component carrier (hereinafter abbreviated CC). In order to support an increasing transmission size, 3GPP LTE-A or 802.16m keeps extending its bandwidth up to 20 MHz or higher. In this case, at least one or more component carriers are aggregated to support the broadband. For instance, if a single component carrier supports a bandwidth of 5 MHz, 10 MHz or 20 MHz, a system bandwidth is supported up to maximum 100 MHz by aggregating maximum 5 component carriers together.

DISCLOSURE OF THE INVENTION

Technical Tasks

One object of the present invention is to provide a method of smoothly transmitting/receiving data between a base station and a user equipment in a wireless access system and an apparatus therefor.

Another object of the present invention is to provide a method of minimizing impact of interference between a base station and a user equipment and transmitting/receiving highly reliable radio resource scheduling information in a wireless access system and apparatus therefor.

The other object of the present invention is to provide a method of providing radio resource scheduling information to a plurality of user equipments in a wireless access system, preferably, in a machine-type communication (MTC) supportive wireless access system and apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving data in a wireless access system includes the steps of receiving an indication message indicating that uplink resource allocation information is transmitted via PDSCH (physical downlink shared channel) from a base station, if resource allocation information configured by a flag value indicating the uplink resource allocation information is received via PDCCH (physical downlink control channel) from the base station, determining the resource allocation information as first downlink resource allocation information based on the indication message, receiving the uplink resource allocation information from the base station via the PDSCH according to the first downlink resource allocation information, and transmitting a uplink data to the base station via PUSCH (physical uplink shared channel) according to the uplink resource allocation information.

To further achieve these and other advantages and in accordance with the purpose of the present invention, according to a different embodiment, a user equipment transmitting and receiving data in a wireless access system includes an RF (radio frequency) unit configured to transmit and receive a radio signal and a processor configured to receive an indication message indicating that uplink resource allocation information is transmitted via PDSCH (physical downlink shared channel) from a base station, if resource allocation information configured by a flag value indicating the uplink resource allocation information is received via PDCCH (physical downlink control channel) from the base station, the processor configured to determine the resource allocation information as first downlink resource allocation information based on the indication message, the processor configured to receive the uplink resource allocation information from the base station via the PDSCH according to the first downlink resource allocation information, the processor configured to transmit a uplink data to the base station via PUSCH (physical uplink shared channel) according to the uplink resource allocation information.

Preferably, if second downlink resource allocation information is received from the base station via the PDCCH together with the first downlink resource allocation information, downlink data according to the second downlink resource allocation information is received via the PDSCH together with the uplink resource allocation information.

Preferably, a modulation and coding scheme (MCS) level used for the uplink resource allocation information is identical to an MCS level used for a case of transmitting the uplink resource allocation information via the PDCCH.

Preferably, a modulation and coding scheme (MCS) level used for PDSCH containing the uplink resource allocation information is identical to an MCS level used for PDCCH of a subframe to which the PDSCH is transmitted thereto.

Preferably, a modulation and coding scheme (MCS) level used for PDSCH containing the uplink resource allocation information is identical to an MCS level used for a most recently transmitted PDCCH before the PDSCH is transmitted.

Preferably, a modulation and coding scheme (MCS) level used for PDSCH containing the uplink resource allocation information is identical to an MCS level used for most recently transmitted uplink resource allocation information before the PDSCH is transmitted.

Preferably, a subframe to which the PDSCH is transmitted corresponds to a firstly appearing subframe after a subframe to which the PDCCH is transmitted.

Preferably, the number of resources to which the uplink resource allocation information is mapped or a position of a resource region is predetermined or configured by an upper layer signaling.

Advantageous Effects

Accordingly, the present invention provides the following effects or advantages.

First of all, according to an embodiment of the present invention, data can be smoothly transceived between a user equipment and a base station in a wireless access system.

Secondly, according to an embodiment of the present invention, downlink control information can be reliably transmitted and influence of interference between homogeneous base stations (homogeneous networks) or between heterogeneous base stations (heterogeneous networks) can be reduced by transmitting uplink resource allocation information (UL grant) via PDSCH (physical downlink shared channel).

Thirdly, according to an embodiment of the present invention, a capacity of a downlink control channel can be increased by transmitting uplink resource allocation information via PDSCH (physical downlink shared channel) in a machine-type communication (MTC) supportive wireless access system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a diagram for a structure of an uplink subframe;

BEST MODE

Mode for Invention

Figure 1:
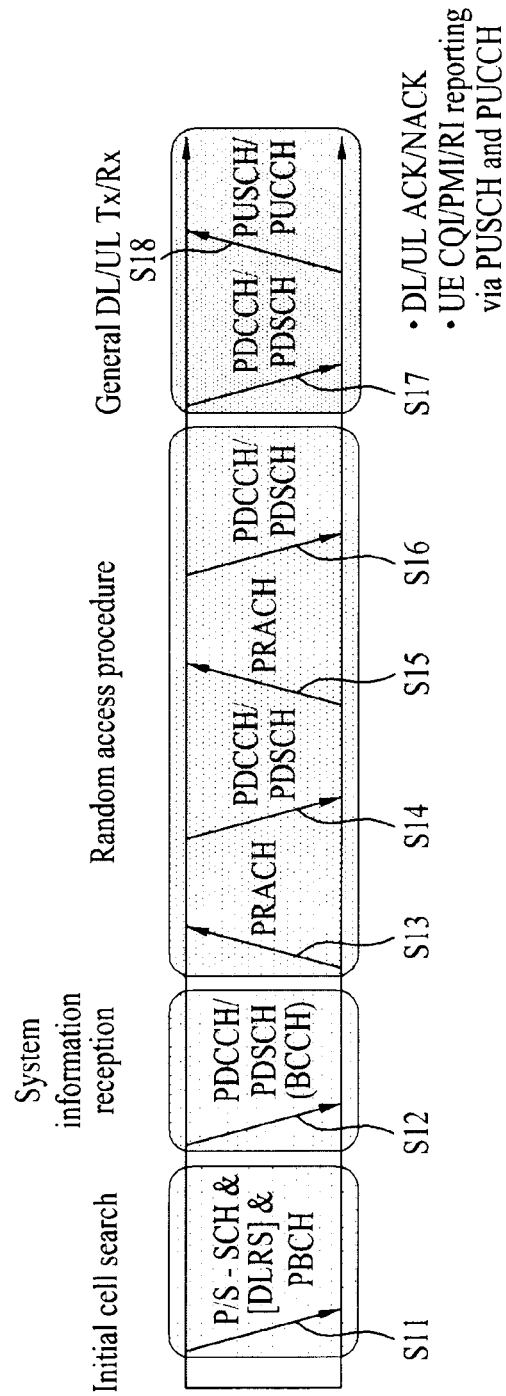
FIG. 1 is a diagram for explaining physical channels used for 3GPP system and a signal transmission using the same.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details.

Occasionally, to prevent the present invention from getting vaguer, structures and/or devices known to the public are skipped or can be represented as block diagrams centering on the core functions of the structures and/or devices.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. Moreover, in this document, 'base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS) and the like.

Specific terminologies used for the following description may be provided to help the understanding of the present invention. And, the use of the specific terminology may be modified into other forms within the scope of the technical idea of the present invention.

Embodiments of the present invention may be supported by the disclosed standard documents of at least one of wireless access systems including IEEE 802 system, 3GPP system, 3GPP LTE and LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink (hereinafter abbreviated) DL and SC-FDMA in uplink (hereinafter abbreviated UL). And, LTE-A (LTE-Advanced) is an evolved version of 3GPP LTE.

For clarity, the following description mainly concerns 3GPP LTE system or 3GPP LTE-A system, by which the technical idea of the present invention may be non-limited.

1. 3GPP LTE/LTE—a System to which the Present Invention is Applicable 1.1. The General of System FIG. 1 is a diagram for explaining physical channels used for 3GPP system and a signal transmission using the same.

Referring to FIG. 1, if a power of a user equipment is turned on or the user equipment enters a new cell, the user equipment may perform an initial cell search job for matching synchronization with a base station and the like [S11]. To this end, the user equipment may receive a primary synchronization channel (P-SCH) and a secondary synchronization channel (S-SCH) from the base station, may match synchronization with the base station and may then obtain information such as a cell ID and the like.

Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S12].

Meanwhile, the user equipment may be able to perform a random access procedure to complete the access to the base station [S13 to S16]. To this end, the user equipment may transmit a specific sequence as a preamble via a physical random access channel (PRACH) [S13] and may be then able to receive a response message via PDCCH and a corresponding PDSCH in response to the random access [S14]. In case of a contention based random access, it may be able to perform a contention resolution procedure such as a transmission S15 of an additional physical random access channel and a channel reception S16 of a physical downlink control channel and a corresponding physical downlink shared channel.

Having performed the above mentioned procedures, the user equipment may be able to perform a PDCCH/PDSCH reception S17 and a PUSCH/PUCCH (physical uplink shared channel/physical uplink control channel) transmission S18 as a general uplink/downlink signal transmission procedure.

Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like.

In LTE system, the UCI is normally transmitted via PUCCH by periods. Yet, in case that both control information and traffic data need to be simultaneously transmitted, the UCI may be transmitted via PUSCH. Moreover, the UCI may be non-periodically transmitted in response to a request/indication made by a network.

Figure 2:
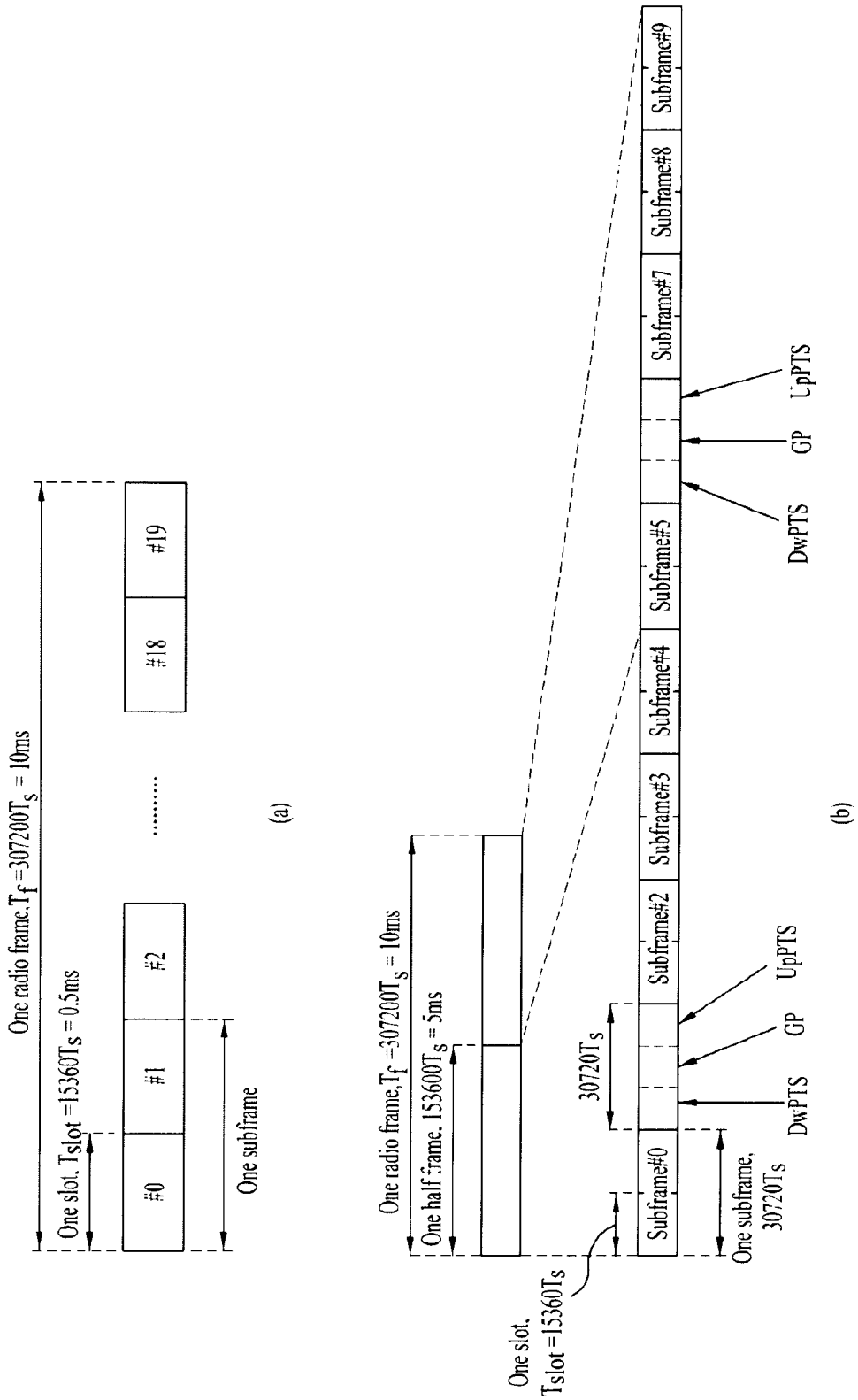
FIG. 2 is a diagram for a structure of a radio frame in 3GPP LTE.

FIG. 2 shows structures of radio frames in 3GPP LTE.

FIG. 2 (a) shows a frame structure type 1. This frame structure type 1 may be applicable to both a full duplex FDD (frequency division duplex) system and a half duplex FDD system.

One radio frame has a length of '$T_f = 307200 \cdot T_s = 10$ ms' and is constructed with 20 slots to which indexes 0 to 19 are respectively given with an equal length of '$T_{slot} = 15360 \cdot T_s = 0.5$ ms'. One subframe is defined as two contiguous slots. For example, an $i^{th}$ subframe is constructed with a slot corresponding to '2i' and a slot corresponding to '2i+1'. In particular, a radio frame includes 10 subframes. And, a time taken to transmit one subframe is called a transmission time interval (hereinafter abbreviated TTI). In this case, Ts indicates a sampling time and may be represented as '$T_s = 1/(15 \text{ kHz} \times 2048) = 3.2552 \times 10^{-8}$ (i.e., about 33 ns)'. One slot may include a plurality of OFDM or SC-FDMA symbols in time domain and may include a plurality of resource blocks (RBs) in frequency domain.

One slot includes a plurality of OFDM (orthogonal frequency division multiplexing) symbols in time domain. Since 3GPP uses OFDMA in downlink, OFDM symbol is provided to indicate one symbol period. The OFDM symbol may be named one SC-FDMA symbol or symbol period. Resource block (RB) is a resource allocation unit and may include a plurality of contiguous subcarriers in one slot.

In the full duplex FDD system, 10 subframes are simultaneously usable for DL and UL transmissions in each 10 ms interval. In doing so, the UL transmission and the DL transmission are separated from each other in frequency domain. On the contrary, in the half duplex FDD system, a user equipment is unable to perform a transmission and a reception at the same time.

The above-described structure of the radio frame is one example only. And, the number of subframes included in a radio frame, the number of slots included in the subframe and the number of symbols included in the slot may be modified in various ways.

FIG. 2 (b) shows a frame structure type 2. The frame structure type 2 is applicable to the TDD system. One radio frame has a length of '$T_f$=307200·$T_s$=10 ms' and is constructed with 2 half-frames each of which has a length of '15360·$T_s$=0.5 ms'. Each of the half-frames is constructed with 5 subframes each of which has a length of '30720·$T_s$=1 ms'. For example, an $i^{th}$ subframe is constructed with a slot corresponding to '2i' and a slot corresponding to '2i+1', each of which has a length of '$T_{slot}$=15360·$T_s$=0.5 ms'. In this case, Ts indicates a sampling time and may be represented as 'Ts=1/(15 kHz×2048)=3.2552×10$^{-8}$ (i.e., about 33 ns)'.

The type 2 frame includes a special subframe constructed with 3 kinds of fields including DwPTS (downlink pilot time slot), GP (guard period) and UpPTS (uplink pilot time slot). The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

Table 1 shows a configuration (length of DwPTS/GP/UpPTS) of a special frame.

Referring to FIG. 4, a UL subframe may be divided into a control region and a data region in frequency domain. A physical UL control channel (PUCCH), which carries UL control information, is allocated to the control region. And, a physical UL shared channel (PUSCH), which carries user data, is allocated to the data region. In order to maintain single carrier property, one user equipment does not transmit PUCCH and PUSCH simultaneously. A resource block pair (RB pair) in subframe is allocated to PUCCH for one user equipment. Resource blocks belonging to the resource block (RB) pair may occupy different subcarriers in each of 2 slots. Namely, a resource block pair allocated to PUCCH is frequency-hopped on a slot boundary.

Figure 5:
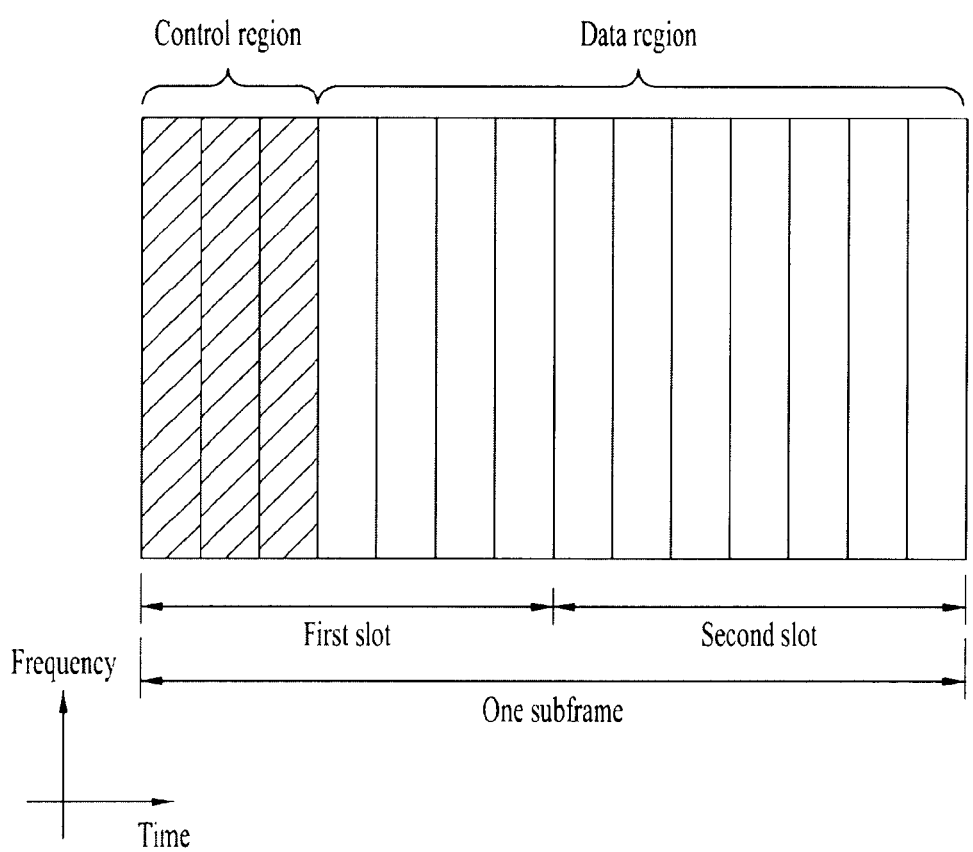
FIG. 5 is a diagram for a structure of a downlink subframe.

FIG. 5 is a diagram for a structure of a downlink (DL) subframe.

Referring to FIG. 5, maximum 3 OFDM symbols situated in a head part of a first slot of one subframe correspond to a control region to which control channels are allocated. The rest of OFDM symbols correspond to a data region to which PDSCH (physical downlink shared channel) is allocated. Examples of DL control channels used by 3GPP LTE may include PCFICH (Physical Control Format Indicator Channel), PDCCH (Physical Downlink Control Channel), PHICH (Physical hybrid automatic repeat request indicator Channel) and the like.

The PCFICH is transmitted in a first OFDM symbol of a subframe and carries information on the number of OFDM symbols used for a transmission of a control channel within the subframe. The PHICH is a response channel in response

TABLE 1

| | | Normal cyclic prefix in downlink | | Extended cyclic prefix in downlink | | |
| --- | --- | --- | --- | --- | --- | --- |
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
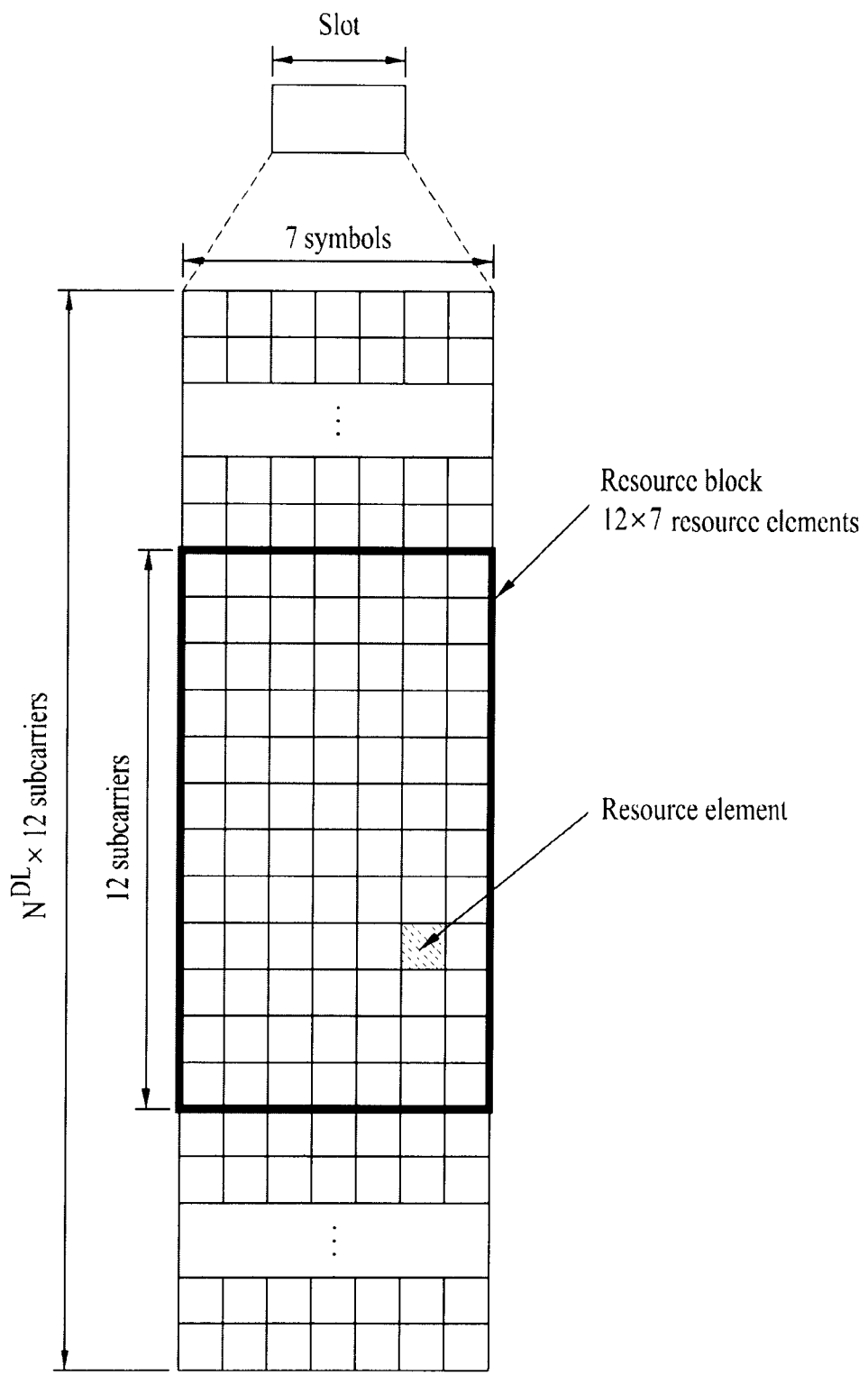
FIG. 3 is a diagram for one example of a resource grid for a downlink slot.

FIG. 3 is a diagram for one example of a resource grid for one downlink (DL) slot.

Referring to FIG. 3, one downlink (DL) slot may include a plurality of OFDM symbols in time domain. In particular, one DL slot exemplarily includes 7 OFDM symbols and one resource block (RB) exemplarily includes 12 subcarriers in frequency domain, by which the present invention may be non-limited.

Each element on a resource grid is called a resource element (hereinafter abbreviated RE). One resource block includes 12×7 resource elements. The number $N^{DL}$ of resource blocks included in a DL slot may depend on a DL transmission bandwidth. And, the structure of an uplink (UL) slot may be identical to that of the DL slot.

FIG. 4 is a diagram for a structure of an uplink (UL) subframe.

to UL and carries ACK/NACK (acknowledgement/non-acknowledgement) signal for HARQ (hybrid automatic repeat request). Control information carried via PDCCH may be called downlink control information (hereinafter abbreviated DCI). The DCI may include UL resource allocation information, DL resource allocation information or a UL transmission (Tx) power control command for a random UE (user equipment) group.

1.2. PDCCH (Physical Downlink Control Channel)

1.2.1. The General of PDCCH

PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted via PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). The PDCCH configured with the aggregation of the at least one or more contiguous CCEs undergoes sub-block interleaving and may be then transmitted via the control region. CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs.

1.2.2. PDCCH Structure

A plurality of PDCCHs multiplexed for a plurality of user equipments can be transmitted in a control region. PDCCH is configured with one CCE or the aggregation of at least 2 contiguous CCEs [CCE aggregation]. In this case, the CCE means a unit corresponding to 9 sets of REGs each of which is configured with 4 resource elements. And, 4 QPSK (quadrature phase shift keying) symbols are mapped to each of the REGs. Resource elements occupied by RS (reference signal) are not included in the REG. In particular, the total number of REGs in OFDM symbol may vary by depending on whether a cell-specific reference signal exists. The concept of REG for mapping 4 resource elements to one group may apply to other DL control channels (e.g., PCFICH, PHICH, etc.). Assuming that REG not assigned to PCFICH or PHICH is set to $N_{REG}$, the number of CCEs available for a system is represented as '$N_{CCE}=\lfloor N_{REG}/9 \rfloor$' and indexes 0 to '$N_{CCE}-1$' are given to the CCEs in order, respectively.

In order to simplify a decoding process of a user equipment, PDCCH format including n CCEs may start with CCE having an index equal to the multiple of n. In particular, if a CCE index is i, the PDCCH format may start with the CCE that satisfies the equation 'i mod n=0'.

In order to configure a single PDCCH signal, a base station may be able to use CCEs, of which number belongs to {1, 2, 4, 8}. In this case, {1, 2, 4, 8} is called a CCE aggregation level. The number of CCEs used for a transmission of a specific PDCCH is determined by a base station in accordance with a channel state. For instance, a single CCE may be sufficient for a PDCCH provided for a user equipment having a good DL channel state (e.g., a case that the user equipment is located in the vicinity of a base station). On the other hand, in case of a user equipment having a poor channel state (e.g., a case that the user equipment is located on a cell edge or boundary), 8 CCEs may be required for sufficient robustness. Besides, a power level of PDCCH may be adjusted in a manner of being matched to the channel state.

Table 2 shows PDCCH format. 4 kinds of PDCCH formats are supported in accordance with CCE aggregation levels.

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

User equipments differ from each other in CCE aggregation level. This is because a format or MCS (modulation and coding scheme) level of control information carried on PDCCH is different. In this case, the MCS level means a code rate used for data coding and a modulation order. An adaptive MCS level is used for a link adaptation. Generally, in a control channel for transmitting control information, 3 or 4 MCS levels may be taken into consideration.

In the following description, PDCCH is explained in detail. First of all, control information carried on PDCCH may be called downlink control information (DCI). A configuration of information loaded on PDCCH payload may vary in accordance with DCI format. In this case, the PDCCH payload may mean information bit(s). Table 3 shows DCI in accordance with DCI format.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |

Referring to Table 3, DCI formats may include a format 0 for PUSCH scheduling, a format 1 for scheduling of one PDSCH codeword, a format 1A for compact scheduling of one PDSCH codeword, a format 1C for very compact scheduling of DL-SCH, a format 2 for PDSCH scheduling in closed-loop spatial multiplexing mode, a format 2A for PDSCH scheduling in open-loop spatial multiplexing mode, a format 3 for a transmission of a TPC (transmission power control) command for a UL channel, and a format 3A for a transmission of a TPC (transmission power control) command for a UL channel. Moreover, a DCI format 1A is usable for PDSCH scheduling despite that any kind of transmission mode is set for a user equipment.

PDCCH payload length may vary in accordance with DCI format. A PDCCH payload type and a length thereof may vary in accordance with a presence or non-presence of a compact scheduling, a transmission mode configured for a user equipment, or the like.

The transmission mode may be configured in order for a user equipment to receive DL data via PDSCH. For instance, the DL data via PDSCH may include scheduled data for a user equipment, paging, random access response, broadcast information via BCCH and the like. The DL data via PDSCH is related to the DCI format signaled via PDCCH. The transmission mode may be semi-statically configured by an upper layer signaling (e.g., RRC (radio resource control) signaling, etc.). The transmission mode may be categorized into a single antenna transmission and a multi-antenna transmission. A transmission mode is semi-statically configured for a user equipment by the upper layer signaling. For instance, the multi-antenna transmission may include transmit diversity, open-loop spatial multiplexing, closed-loop spatial multiplexing, MU-MIMO (multiuser-multiple input multiple output), beamforming or the like. The transmit diversity is the technology of raising transmission reliability by transmitting the same data via multiple transmitting antennas. The spatial multiplexing is the technology of transmitting high-speed data without increasing a bandwidth of a system by simultaneously transmitting different data via multiple transmitting antennas. The beamforming is the technology of increasing SINR (signal to interference plus noise ratio) of a signal by adding a weight in accordance with a channel state at multi-antenna.

DCI format depends on a transmission mode configured in a user equipment. The user equipment has a reference DCI format of monitoring in a transmission mode configured for the user equipment. The transmission mode configured in the user equipment may correspond to one of 7 transmission modes as follows.

(1) Single antenna port: Port 0
(2) Transmit diversity
(3) Open-loop spatial multiplexing
(4) Closed-loop spatial multiplexing
(5) Multi-user MIMO
(6) Closed-loop rank=1 precoding
(7) Single antenna port: Port 5

1.2.3. PDCCH Transmission

A base station determines PDCCH format in accordance with DCI to transmit to a user equipment and attaches CRC (cyclic redundancy check) to control information. The CRC is masked with a unique identifier (called RNTI (radio network temporary identifier) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). In order to indicate a random access response that is a response to a transmission of a random access preamble of a user equipment, CRC can be masked with RA-RNTI (random access-RNTI).

Subsequently, the base station creates coded data by performing channel coding on the CRC attached control information. In doing so, the channel coding may be performed at a code rate in accordance with an MCS level. The base station performs a rate matching in accordance with a CCE aggregation level assigned to PDCCH format and then generates modulated symbols by modulating the coded data. In doing so, it may be able to use a modulation sequence in accordance with an MCS level. The modulated symbols configuring one PDCCH may have a CCE aggregation level set to one of 1, 2, 4 and 8. Thereafter, the base station maps the modulated symbols to physical resource elements [CCE to RE mapping].

1.2.4. Blind Decoding

A plurality of PDCCHs can be transmitted in a single subframe. In particular, a control region of one subframe is configured with a plurality of CCEs having indexes set to 0 to ($N_{CCE,k}-1$). In particular, the $N_{CCE,k}$ means the total number of CCEs in a control region of $k^{th}$ subframe. A user equipment monitors a plurality of PDCCHs in each subframe. In this case, the verb 'monitor' means that the user equipment attempts decoding of each of the PDCCHs in accordance with a monitored PDCCH format. In a control region assigned within a subframe, a base station does not provide information indicating where a PDCCH corresponding to the user equipment is located. In order to receive a control channel transmitted from the base station, since the user equipment is unable to know that its PDCCH is transmitted in a specific DCI format or on a specific CCE aggregation level at a specific position, the user equipment finds its PDCCH by monitoring an aggregation of PDCCH candidates in a subframe. This is called a blind decoding/detection (BD). According to the blind decoding, a user equipment takes its UE ID (user equipment identifier) from a CRC part by demasking and then confirms whether the corresponding PDCCH is a control channel of the user equipment by checking CRC error.

In an active mode, a user equipment monitors PDCCH of every subframe to receive data transmitted to the user equipment. In DRX mode, a user equipment wakes up in a monitoring interval of each DRX period and then monitors PDCCH in a subframe corresponding to the monitoring interval. In doing so, a subframe for monitoring PDCCH is called a non-DRX subframe.

The user equipment should perform blind decoding on all CCEs existing in a control region of the non-DRX subframe on order to receive PDCCH transmitted to the user equipment. Since the user equipment does not know which PDCCH format will be received, it should decode all PDCCHs on possible CCE aggregation levels in every non-DRX subframe until succeeding in the blind decoding of PDCCHs. Moreover, since the user equipment does not know how many CCEs will be used by the PDCCH for the user equipment, the user equipment should attempt detection on all possible CCE aggregation levels until succeeding in the blind decoding of PDCCH. The user equipment performs the blind decoding according to the CCE aggregation level. In particular, the user equipment attempts decoding with a CCE aggregation level unit of 1. If fails to decode all with the CCE aggregation level unit of 1, the user equipment attempts decoding with a CCE aggregation level unit of 2. Subsequently, the user equipment attempts decoding with a CCE aggregation level unit of 4 and 8, respectively. Moreover, the user equipment attempts blind decoding on all of C-RNTI, P-RNTI, SI-RNTI, and RA-RNTI. The user equipment attempts blind decoding on all DCI formats which are to be monitored by the user equipment.

If a user equipment attempts blind decoding on all available RNTI and all DCI formats to be monitored according to all CCE aggregation levels, the number of detection attempts may be excessively enormous. Hence, a concept of a search space (SS) is defined for a blind decoding performed by a user equipment in LTE system. A search space means a PDCCH candidate set to be monitored and may have a size different in accordance with each PDCCH format.

The search space may be configured with a common search space (CSS) and a UE-specific/dedicated search space (USS). In case of the common search space, all user equipments may be able to know a size of the common search space. On the other hand, the UE-specific search space may be individually set for each of the user equipments. Hence, a user equipment should monitor both of the UE-specific search space and the common search space to decode PDCCH, thereby performing the blind decoding (BD) in a single frame 44 times to the maximum. In doing so, the blind decoding performed in accordance with a different CRC value (e.g., C-RNTI, P-RNTI, SI-RNTI, RA-RNTI) is not included.

Due to a small search space, it may happen that a base station is unable to reserve CCE resources enough to transmit PDCCH to all user equipments attempting to transmit PDCCH in a given subframe. This is because resources remaining after assignment of CCE positions may not be included in a search space of a specific user equipment. In order to minimize this barrier that may be kept in a next subframe, a UE-specific hopping sequence may apply to a start point of the UE-specific search space.

Table 4 shows sizes of a common search space and a UE-specific search space.

TABLE 4

| PDCCH format | Number of CCEs (n) | Number of candidates in common search space | Number of candidates in dedicated search space |
| --- | --- | --- | --- |
| 0 | 1 | — | 6 |
| 1 | 2 | — | 6 |
| 2 | 4 | 4 | 2 |
| 3 | 8 | 2 | 2 |

In order to reduce a calculation load of a user equipment due to a blind decoding attempt count, a user equipment does not perform searches in accordance with all the defined DCI formats at the same time. In particular, the user equipment always searches a UE-search space for DCI format 0 and DCI format 1A. In doing so, although the DCI format 0 and the DCI format 1A are equal to each other in size, the user equipment is able to identify DCI formats using flags used to identify the DCI format 0 and the DCI format 1A included in PDCCH [Flags for format 0/format 1A differentiation]. Moreover, DCI formats other than the DCI format 0 or the DCI format 1A may be requested to the user equipment according to a PDSCH transmission mode configured by a base station. For example, the requested DCI formats may include DCI format 1, DCI format 1B and DCI format 2.

A user equipment may be able to search a common search space for DCI format 1A and DCI format 1C. Moreover, the user equipment may be set to search for DCI format 3 or DCI format 3A. In this case, although the DCI format 3/A may have the same size of the DCI format 0/1A, the user equipment may be able to identify a DCI format using CRC scrambled by an identifier other than a UE-specific identifier.

Search space $S_k^{(L)}$ means a PDCCH candidate set in accordance with an aggregation level L∈{1, 2, 4, 8}. CCE in accordance with a PDCCH candidate set m of the search space may be determined by Formula 1.

$$L \cdot \{(Y_k+m) \bmod \lfloor N_{CCE,k}/L \rfloor\} + i \quad \text{[Formula 1]}$$

In Formula 1, $M^{(L)}$ indicates the number of PDCCH candidates in accordance with a CCE aggregation level L to be monitored in a search space, where m=0, . . . , $M^{(L)}$−1. The i is an index for designating an individual CCE in each of PDCCH candidates and may be represented as 'i=0, . . . , L−1'.

In order to decode PDCCH, as mentioned in the foregoing description, a user equipment monitors both a UE-specific search space and a common search space. In this case, the common search space (CSS) supports PDCCHs having the aggregation level of {4, 8}, while the UE-specific search space (USS) supports PDCCHs having the aggregation level of {1, 2, 4, 8}.

Table 5 shows PDCCH candidates monitored by a user equipment.

TABLE 5

| | Search space $S_k^{(L)}$ | | Number of PDCCH |
| --- | --- | --- | --- |
| Type | Aggregation level L | Size [in CCEs] | candidates $M^{(L)}$ |
| UE- | 1 | 6 | 6 |
| specific | 2 | 12 | 6 |
| | 4 | 8 | 2 |
| | 8 | 16 | 2 |
| Common | 4 | 16 | 4 |
| | 8 | 16 | 2 |

Referring to Formula 1, in case of a common search space, for two aggregation levels, L=4 and L=8, $Y_k$ is set to 0. On the contrary, in case of a UE-specific search space, for an aggregation level L, $Y_k$ is defined as Formula 2.

$$Y_k = (A \cdot Y_{k-1}) \bmod D \quad \text{[Formula 2]}$$

2. Carrier Aggregation Environment 2.1. The General of Carrier Aggregation

Communication environments taken into consideration by embodiments of the present invention include a multicarrier supportive environment. In particular, a multicarrier or CA (carrier aggregation) system used by the present invention means a system that uses at least one component carrier (CC) having a bandwidth smaller than a target band by aggregation in configuring a target broadband to support a broadband.

According to the present invention, multicarrier means aggregation of carriers (or carrier aggregation). In this case, the carrier aggregation means aggregation of non-contiguous carriers as well as aggregation of contiguous carriers. Moreover, the number of component carriers aggregated in DL may be set to different from that of component carriers aggregated in UL. If the downlink component carrier (hereinafter abbreviated DL CC) number and the uplink component carrier (hereinafter abbreviated UL CC) number are equal to each other, it is called a symmetric aggregation. Otherwise, it is called an asymmetric aggregation. The above-mentioned carrier aggregation may be interchangeably substituted with such a terminology as a bandwidth aggregation, a spectrum aggregation and the like.

In the carrier aggregation configured in a manner of combining at least two or more component carriers together, the goal of the LTE-A system is to support bandwidths up to 100 MHz. When at least one carrier having a bandwidth smaller than a target band is combined or aggregated, the bandwidth of the aggregated carrier may be limited to a bandwidth used by a legacy IMT system to secure backward compatibility with the legacy system. For instance, a legacy 3GPP LTE system supports bandwidths of {1.4, 3, 5, 10, 15, 20} MHz and a 3GPP LTE-advanced (LTE-A) system may be configured to support a bandwidth greater than 20 MHz for compatibility with the legacy system using the above bandwidths only. Moreover, a carrier aggregation system of the present invention may be configured to support carrier aggregation by defining a new bandwidth irrespective of bandwidths used by a legacy system.

LTE-A system uses the concept of a cell to manage radio resources. The above-mentioned carrier aggregation environment may be called a multi-cell environment (environment of multiple cells). A cell is defined as a combination of a pair of a DL resource (DL CC) and a UL resource (UL CC). Yet, the UL resource is not a necessary element. Hence, the cell may be configured with a DL resource only or both a DL resource and a UL resource. In case that a specific user equipment has one configured serving cell only, it may have one DL CC and one UL CC. Yet, in case that a specific user equipment has at least two configured serving cells, the number of DL CCs is equal to the number of the cells but the number of UL CCs may be equal to or smaller than the number of the cells. Alternatively, DL CCs and UL CCs may be configured to the contrary. In particular, in case that a specific user equipment has a plurality of configured serving cells, it may be able to support a carrier aggregation environment in which the number of UL CCs is greater than that of DL CCs. In more particular, carrier aggregation may be understood as aggregation of at least two cells differing from each other in carrier frequency (e.g., center frequency of cell). In this case, the above-mentioned 'cell' should be discriminated from a generally used cell that is an area covered by a base station.

Cells used by LTE-A system may include a primary cell (PCell) and a secondary cell (SCell). PCell and SCell may be used as a serving cell. If a carrier aggregation is not configured for a user equipment in RRC_CONNECTED state or a user equipment does not support a carrier aggregation, there exists one serving cell configured with PCell only. On the other hand, if a carrier aggregation is configured for a user equipment in RRC_CONNECTED state, at least one serving cell may be able to exist. And, PCell and at least one SCell are included in all the serving cells.

Serving cell (e.g., PCell, SCell) may be configured via RRC parameters. In particular, PhysCellId is a physical layer identifier and has an integer value ranging 0 to 503. SCellIndex is a short identifier used to identify SCell and has an integer value ranging 1 to 7. ServeCellIndex is a short identifier used to identify a serving cell (e.g., PCell, SCell) and has a value ranging 0 to 7. A value of 0 is applied to PCell and ScellIndex is previously given to be applied to SCell. In particular, a cell having a smallest cell ID (or a smallest cell index) in ServCellIndex becomes PCell.

The PCell means the cell operating on a primary frequency (or, a primary CC). The PCell is usable for a user equipment to perform an initial connection establishment process or a connection reconfiguration process. The PCell may include a cell indicated in a handover procedure. The PCell may mean the cell becomes a center of a control related communication in the serving cell configured in a carrier aggregation environment. In particular, a user equipment is able to perform a transmission by receiving assignment of PUCCH in its PCell only and is able to use the PCell only in obtaining system information or changing a monitoring procedure. E-UTRAN (evolved universal terrestrial radio access) may change PCell only for a handover procedure in a manner of sending a user equipment supportive of carrier aggregation environment an RRC connection reconfiguration (RRCConnectionReconfiguration) message of an upper layer, which contains mobility control information (mobilityControlInfo).

The SCell may mean the cell operating on a secondary frequency (or, a secondary CC). One PCell is assigned to a specific user equipment, while at least one SCell may be assigned to the specific user equipment. The SCell is configurable only after an RRC connection has been established. And, the SCell may be usable to provide an addition radio resource. PUCCH does not exist in the rest of cells (i.e., SCell) except PCell in the serving cell configured in the carrier aggregation environment. When E-UTRAN adds SCell to a user equipment supportive of a carrier aggregation environment, it may be able to provide all system information related to an operation of a related cell in RRC_CONNECTED state via a dedicated signal. A change of system information may be controlled by a release and addition of a related SCell. In doing so, it may be able to use an RRC connection reconfiguration (RRCConnectionReconfiguration) message of an upper layer. E-UTRAN may perform a dedicated signaling having a parameter differing per user equipment rather than broadcasting in a related SCell.

After an initial security activating process has started, E-UTRAN may be able to configure a network including at least one SCell in addition to PCell configured in the early stage of a connection establishment process. In a carrier aggregation environment, PCell or SCell may be able to work as a component carrier. In the following description of embodiments, a primary component carrier (PCC) may be usable as having the same meaning of PCell and a secondary component carrier (SCC) may be usable as having the same meaning of SCell.

Figure 6:
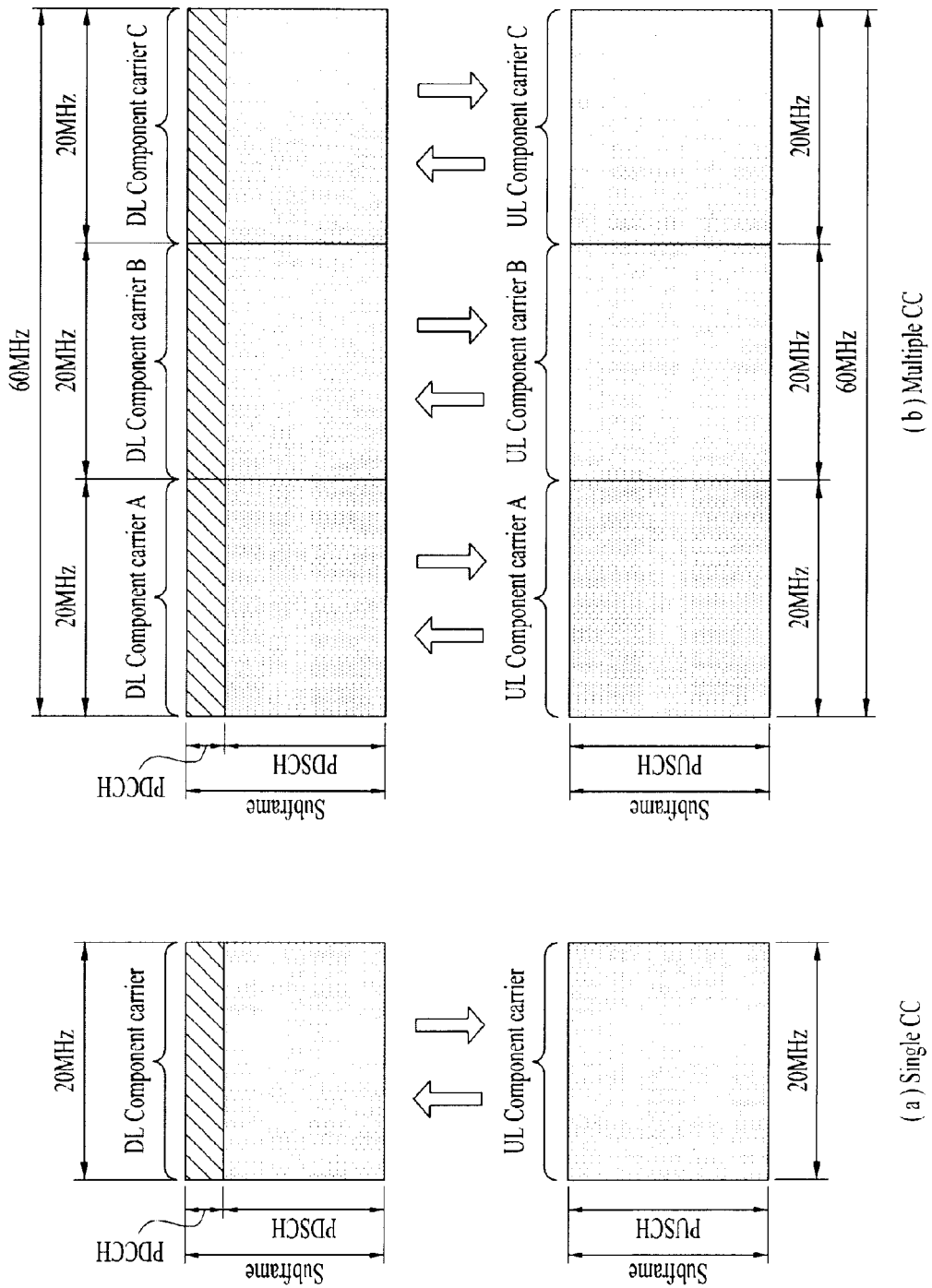
FIG. 6 is a diagram for one example of component carriers of LTE system and carrier aggregation used by LTE-A system.

FIG. 6 is a diagram for one example of component carriers of LTE system and carrier aggregation used by LTE-A system.

FIG. 6 (a) shows a single carrier structure used by LTE system. Component carriers include DL CC and UL CC. One component carrier may have a frequency range of 20 MHz.

FIG. 6 (B) shows a carrier aggregation structure used by LTE-A system. Referring to FIG. 6(b), 3 components carriers, each of which has a frequency size of 20 MHz, are aggregated together. 3 DL CCs and 3 UL CCs are present, by which the number of DL CCs or the number of UL CCs may be non-limited. In case of carrier aggregation, a user equipment may be able to monitor 3 CCs at the same time, receive DL signal/data, and transmit UL signal/data.

In case that N DL CCs are managed in a specific cell, a network may be able to assign M DL CCs (where, M≤N) to a user equipment. In doing so, the user equipment may be able to monitor the limited M DL CCs only and receive DL signals. Moreover, a network may be able to assign primary DL CC to the user equipment in a manner of prioritizing L DL CCs (where, L≤M≤N). In doing so, the user equipment should monitor the L DL CCs. This mechanism may be exactly applicable to a UL transmission.

A linkage between a carrier frequency (or DL CC) of a DL resource and a carrier frequency (or UL CC) of a UL resource may be indicated by such an upper layer message as an RRC message or a system information. For instance, by a linkage defined by SIB2 (system information block type 2), a combination of DL and UL resources may be configured. In particular, a linkage may mean a mapping relation between a DL CC for transmitting PDCCH carrying a UL grant and a UL CC using the UL grant or a mapping relation between a DL/UL CC for carrying HARQ data and a UL/DL CC for carrying HARQ ACK/NACK signal.

2.2. Cross Carrier Scheduling

In a carrier aggregation system, a self-scheduling method and a cross carrier scheduling method exist in aspect of carrier or serving cell scheduling. In particular, a cross carrier scheduling may be named a cross component carrier scheduling or a cross cell scheduling.

A self-scheduling means that PDCCH (DL grant) and PDSCH are carried on the same DL CC or that PUSCH transmitted in accordance with PDCCH (UL grant) carried on DL CC is transmitted on UL CC linked with the DL CC having carried the UL grant.

A cross carrier scheduling means that PDCCH (DL grant) and PDSCH are transmitted on different DL CCs, respectively or that PUSCH transmitted in accordance with PDCCH (UL grant) carried on DL CC is transmitted on a different UL CC that is not the UL CC linked with the DL CC having carried the UL grant.

Whether to perform a cross carrier scheduling may be UE-specifically activated or deactivated and may be notified to each user equipment semi-statically via an upper layer signaling (e.g., RRC signaling).

In case that the cross carrier scheduling is activated, PDCCH needs a carrier field indicator (CIF) that indicates that PDSCH/PUSCH indicated by the corresponding PDCCH is carried on which DL/UL CC. For instance, PDCCH is able to assign a PDSCH or PUSCH resource to one of a plurality of component carriers using the CIF. In particular, if PDCCH on DL CC assigns a PDSCH or PUSCH resource to one of multiply aggregated DL/UL CCs, CIF is configured. In this case, DCI format of LTE-A Release-8 may be extended in accordance with CIF. In doing so, the configured CIF is fixed to a 3-bit field or a position of the configured CIF may be stationary irrespective of a DCI format size. Moreover, it may be able to reuse a PDCCH structure of LTE-A Release-8 (e.g., a resource mapping on the basis of the same coding and CCE).

On the other hand, in case that PDCCH on DL CC assigns a PDSCH resource on the same DL CC or a PUSCH resource on a singly linked UL CC, CIF is not configured. In this case, it may be able to use the same PDCCH structure and DCI format of LTE-A Release-8 (e.g., a resource mapping on the basis of the same coding and CCE).

When a cross carrier scheduling is possible, a user equipment needs to monitor PDCCH for a plurality of DCIs in a control region of monitoring CC in accordance with a per-CC transmission mode and/or bandwidth. To support this, a search space configuration and PDCCH monitoring may be required.

In a carrier aggregation system, a UE DL CC set indicates a set of DL CCs scheduled to enable a user equipment to receive PDSCH and a UE UL CC set indicates a set of UL CCs scheduled to enable a user equipment to transmit PUSCH. And, a PDCCH monitoring set indicates a set of at least one DL CC for performing a PDCCH monitoring. The PDCCH monitoring set may be equal to the UE DL CC set or may be a subset of the UE DL CC set. The PDCCH monitoring set may include at least one of DL CCs belonging to the UE DL CC set. Alternatively, the PDCCH monitoring set may be separately defined irrespective of the UE DL CC set. The DL CC included in the PDCCH monitoring set may be configured to always enable a self-scheduling of a linked UL CC. Thus, the UE DL C set, the UE UL CC set and the PDCCH monitoring set may be configured UE-specifically, UE group-specifically or cell-specifically.

In case that the cross carrier scheduling is inactive, it means that a PDCCH monitoring set is always equal to a UE DL CC set. In this case, such an indication as a separate signaling for the PDCCH monitoring set is not necessary. Yet, in case that a cross carrier scheduling is active, it is preferable that a PDCCH monitoring set is defined within a UE DL CC set. In particular, in order to schedule a PDSCH or PUSCH for a user equipment, a base station transmits PDCCH on a PDCCH monitoring set only.

Figure 7:
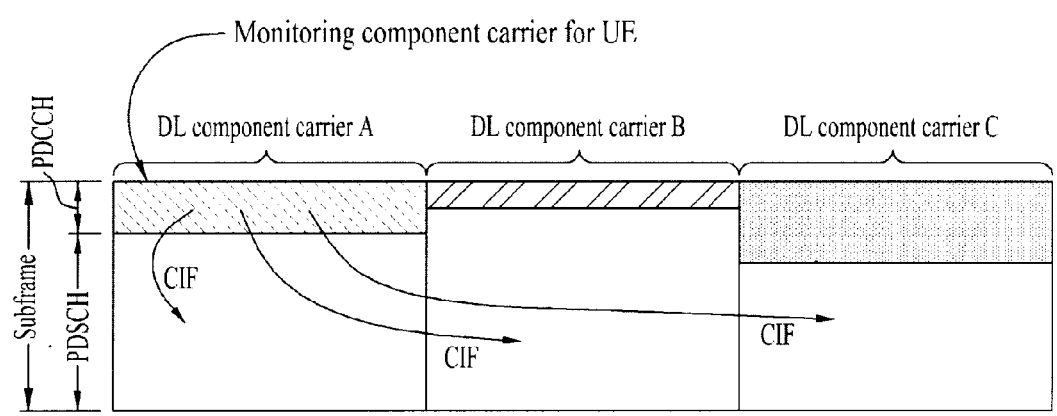
FIG. 7 is a diagram for a subframe structure of LTE-A system in accordance with cross carrier scheduling.

FIG. 7 is a diagram for a subframe structure of LTE-A system in accordance with cross carrier scheduling.

Referring to FIG. 7, a DL subframe for an LTE-A user equipment represents a case that 3 DL CCs are combined and that DL CC 'A' is set as a PDCCH monitoring DL CC. If CIF is not used, each DL CC may be able to transmit a PDCCH for scheduling its PDSCH without the CIF. On the other hand, if a CIF is used via an upper layer signaling, the only DL CC 'A' is able to transmit its PDSCH or a PDCCH for scheduling a PDSCH of another CC using the CIF. In doing so, DL CC 'B' or DL CC 'C', which is not set as the PDCCH monitoring DL CC, does not transmit PDCCH.

3. The General of UL/DL Scheduling in TDD System 3.1. UL-DL Configuration in TDD System In a frame structure type 2, UL-DL configuration indicates that all subframes are assigned to (reserved) UL and DL by a prescribed rule. Table 6 shows UL-DL configuration.

TABLE 6

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Referring to Table 6, in each subframe of a radio frame, 'D' indicates a subframe for DL transmission, 'U' indicates a subframe for UL transmission, and 'S' indicates a special subframe constructed with 3 kinds of fields including DwPTS, GP and UpPTS. UL-DL configurations may be classified into 7 types. And, the respective configurations differ from each other in the positions or number of DL subframes, special frames and UL subframes.

A point of switching DL to UL or a point of switching UL to DL is called a switching point. Switch-point periodicity means a period in which a switching operation between UL and DL subframes is identically repeated and supports both 5 ms and 10 ms. In case of the 5 ms DL-UL switch-point periodicity, a special subframe (S) exists in every half-frame. In case of the 10 ms DL-UL switch-point periodicity, a special subframe (S) exists in a $1^{st}$ half-frame only.

In all configurations, $0^{th}$ subframe, $5^{th}$ subframe and DwPTS are intervals provided for a DL transmission only. UpPTS and a subframe directly contiguous with a special subframe are always intervals for a UL transmission.

The above-mentioned UL-DL configuration is system information. The configuration may be known to both a base station and a user equipment. The base station is able to inform the user equipment of a change of the UL-DL assigned state of a radio frame in a manner of transmitting an index of configuration information only whenever the UL-DL configuration information is changed. The configuration information is a sort of DL control information and can be transmitted via PDCCH (physical downlink control channel), which is a DL control channel, similar to other scheduling information. Moreover, the configuration information is broadcast information and can be commonly transmitted to all user equipments in a cell on a broadcast channel. In the TDD system, the number of half-frames included in a radio frame, the number of subframes included in the half-frame and a combination of DL and UL subframes are just exemplary.

3.2. UL/DL Scheduling in TDD System

Since DL/UL subframe configuration in TDD system differs per UL-DL configuration, PUSCH and PHICH transmission times are set differently in accordance with the configuration. And, the transmission times of PUSCH and PHICH may be differently configured in accordance with an index (or number) of a subframe.

In LTE system, UL/DL timing relation of PUSCH, PDCCH ahead of the PUSCH and PHICH for carrying DL HARQ ACK/NACK corresponding to the PUSCH is determined in advance.

Table 7 is a table indicating transmission timings between PDCCH and corresponding PUSCH in accordance with UL/DL configuration.

TABLE 7

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | | 4 | 6 | | |
| 1 | | 6 | | | 4 | | | 6 | | 4 |
| 2 | | | 4 | | | | | | 4 | |
| 3 | 4 | | | | | | | 4 | 4 | |
| 4 | | | | | | | | 4 | 4 | |
| 5 | | | | | | | | 4 | | |
| 6 | 7 | 7 | | | | 7 | 7 | | | 5 |

Referring to Table 7, in case of UL/DL configuration 1 to 6, when a UL grant is received via PDCCH from a base station in $n^{th}$ DL subframe or PHICH is required to be retransmitted after receiving the PHICH, a user equipment transmits PUSCH in n+k UL subframe in response to a DL subframe index in which the PDCCH (or, PHICH) is transmitted. In this case, a value of k is depicted in Table 7.

In case of UL/DL configuration 0, according to UL index value within a UL DCI format, DL subframe number to which PHICH is transmitted, and $I_{PHICH}$ value determined by the UL subframe number received by an upper layer or to which PUSCH is transmitted, PUSCH is transmitted in accordance with Table 7, is transmitted in n+7 UL subframe, or is transmitted in both the UL subframe according to Table 7 and the n+7 UL subframe.

Meanwhile, if a user equipment receives PHICH including HARQ ACK/NACK from a base station in a DL subframe i, the PHICH corresponds to PUSCH, which is transmitted by the user equipment in a UL subframe i−k. In this case, k value is depicted in Table 8.

Table 8 indicates transmission timing relations between PUSCH and corresponding PHICH in accordance with UL/DL configuration.

TABLE 8

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

In case of UL/DL configuration 1 to 6 or in case of UL/DL configuration 0 and $I_{PHICH}$ value corresponds to 0, if a user equipment receives PHICH carrying HARQ-ACK from a base station in a subframe i, the PHICH may correspond to PUSCH transmitted by a user equipment in a subframe i−k. On the contrary, in case of UL/DL configuration 0 and $I_{PHICH}$ value corresponds to 1, if a user equipment receives PHICH carrying HARQ-ACK from a base station in a subframe i, the PHICH may correspond to PUSCH transmitted by a user equipment in a subframe i−6.

If ACK is decoded by receiving PHICH corresponding to a transport block in a DL subframe i after transmitting the transport block via PUSCH subframe corresponding to the DL subframe i or if the transport block is disabled by PDCCH transmitted in the DL subframe i, a user equipment delivers the ACK corresponding to the transport block to an upper layer.

In the aspect of a user equipment, ACK/NACK response (or, PHICH) for a UL transmission, which is transmitted via PUSCH of the user equipment and the like in $n^{th}$ UL subframe, is transmitted from a base station according to a corresponding UL subframe index in a corresponding n+k DL subframe. In case of a subframe bundling, a corresponding PHICH may correspond to a last subframe of a bundle. A user equipment should search/detect/demodulate the corresponding PHICH in a manner of anticipating that PHICH response for PUSCH transmitted by the user equipment is transmitted from a base station in n+k DL subframe. In this case, a value of k is depicted in Table 9.

Table 9 indicates timing relations between PUSCH and corresponding PHICH in accordance with UL/DL configuration.

TABLE 9

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | | 4 | 7 | 6 | | | 4 | 7 | 6 |
| 1 | | | 4 | 6 | | | | | 4 | 6 | |
| 2 | | | 6 | | | | | | 6 | | |
| 3 | | | | 6 | 6 | 6 | | | | | |
| 4 | | | | 6 | 6 | | | | | | |
| 5 | | | 6 | | | | | | | | |
| 6 | | | 4 | 6 | 6 | | | | 4 | 7 | |

PHICH resource is identified by such an index pair as $(n_{PHICH}^{group}, n_{PHICH}^{seq})$. $n_{PHICH}^{group}$ indicates PHICH group number and $n_{PHICH}^{seq}$ indicates an orthogonal sequence index in a corresponding PHICH group. $n_{PHICH}^{group}$ and $n_{PHICH}^{seq}$ can be obtained by Formula 3.

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA} + N_{PHICH}^{group} \rfloor + n_{DMRS}) \bmod 2N_{SF}^{PHICH}$$ [Formula 3]

In this case, $n_{DMRS}$ is mapped from a cyclic shift for a DMRS (demodulation reference signal) field on a latest PDCCH including a UL DCI format for a transport block related to a corresponding PUSCH transmission. On the other hand, when PDCCH including a UL DCI format for an identical transport block does not exist, if an initial PUSCH for the identical transport block is semi-persistently scheduled or is scheduled by a random access approval signal, $n_{DMRS}$ is set to 0.

$N_{SF}^{PHICH}$ indicates a size of a spreading factor used for PHICH modulation.

In case of a first transport block of PUSCH related to PDCCH or in case that the number of transport block passively identified during an absence of a related PDCCH is not identical to the number of transport block indicated by a latest PDCCH related to a corresponding PUSCH, $I_{PRB\_RA}$ can be represented as $I_{PRB\_RA}^{lowest\_index}$. On the other hand, in case of a second transport block of PUSCH related to PDCCH, $I_{PRB\_RA}$ can be represented as $I_{PRB\_RA}^{lowest\_index}$ may correspond to a lowest PRB index of a first slot of a corresponding PUSCH transmission.

$N_{PHICH}^{group}$ indicates PHICH group number constructed by an upper layer.

In UL/DL configuration 0 in a TDD system, if PUSCH is transmitted in a subframe index 4 or 9, $I_{PHICH}$ may have a value of 1. Otherwise, it may have a value of 0.

Table 10 is a table indicating a mapping relation between a cyclic shift for a DMRS field used to determine a PHICH resource via PDCCH including a UL DCI format and $n_{DMRS}$.

TABLE 10

| Cyclic Shift for DMRS Field in PDCCH with uplink DCI format | $n$DMRS |
|---|---|
| 000 | 0 |
| 001 | 1 |
| 010 | 2 |
| 011 | 3 |
| 100 | 4 |
| 101 | 5 |
| 110 | 6 |
| 111 | 7 |

4. Interference Between Base Stations

In a cellular network based wireless communication system, there exists interference between homogeneous base stations (or homogeneous networks) or interference between heterogeneous base stations (or heterogeneous networks). This interference may cause a problem of affecting a control channel as well as a data channel. In the following description, a method for solving this problem is explained.

4.1. Assignment of ABS (Almost Blank Subframe)

Heterogeneous network/deployments may mean a structure in which micro cells for low power/short-range communication coexist in a macro cell based homogeneous network. A macro cell (or a macro base station) means a general cell (or base station) of a wireless communication system with a wide coverage and a high transmission power. A micro cell (or a micro base station) is a small version of a macro cell, is able to operate independently by performing most of functions of a macro cell, and means a cell (or a base station) of a non-overlay type which is overlaid within an area covered by a macro cell or a shadow area not covered by the macro cell. The micro cell has a coverage narrower than that of the macro cell and a transmission power lower than that of the macro cell and is able to accommodate user equipments less than those of the macro cell. This micro cell may be named one of a pico cell, a femto cell, an HeNB (home evolved Node B), a relay and the like.

A user equipment may be directly served by a macro cell or may be served by a micro cell. Occasionally, a user equipment existing within a coverage of a micro cell may be served by the macro cell.

In accordance with a presence or non-presence of restriction put on a user equipment, a micro cell may be classified into two types. The $1^{st}$ type means a CSG (closed subscriber group) cell that does not grant an access of a previous macro user equipment (e.g., a user equipment served by a macro cell) or accesses of other micro user equipments (e.g., user equipments served by a micro cell) without authentication. And, the $2^{nd}$ type means an OASC (open access subscriber group) or OSG (open subscriber group) cell that grants an access of a previous macro user equipment or accesses of other micro user equipments.

In a heterogeneous network environment having a macro cell and a micro cell coexist therein, inter-cell interference more serious than that of a homogeneous network environment having a macro cell (or a micro cell) exist therein only may occur.

Figure 8:
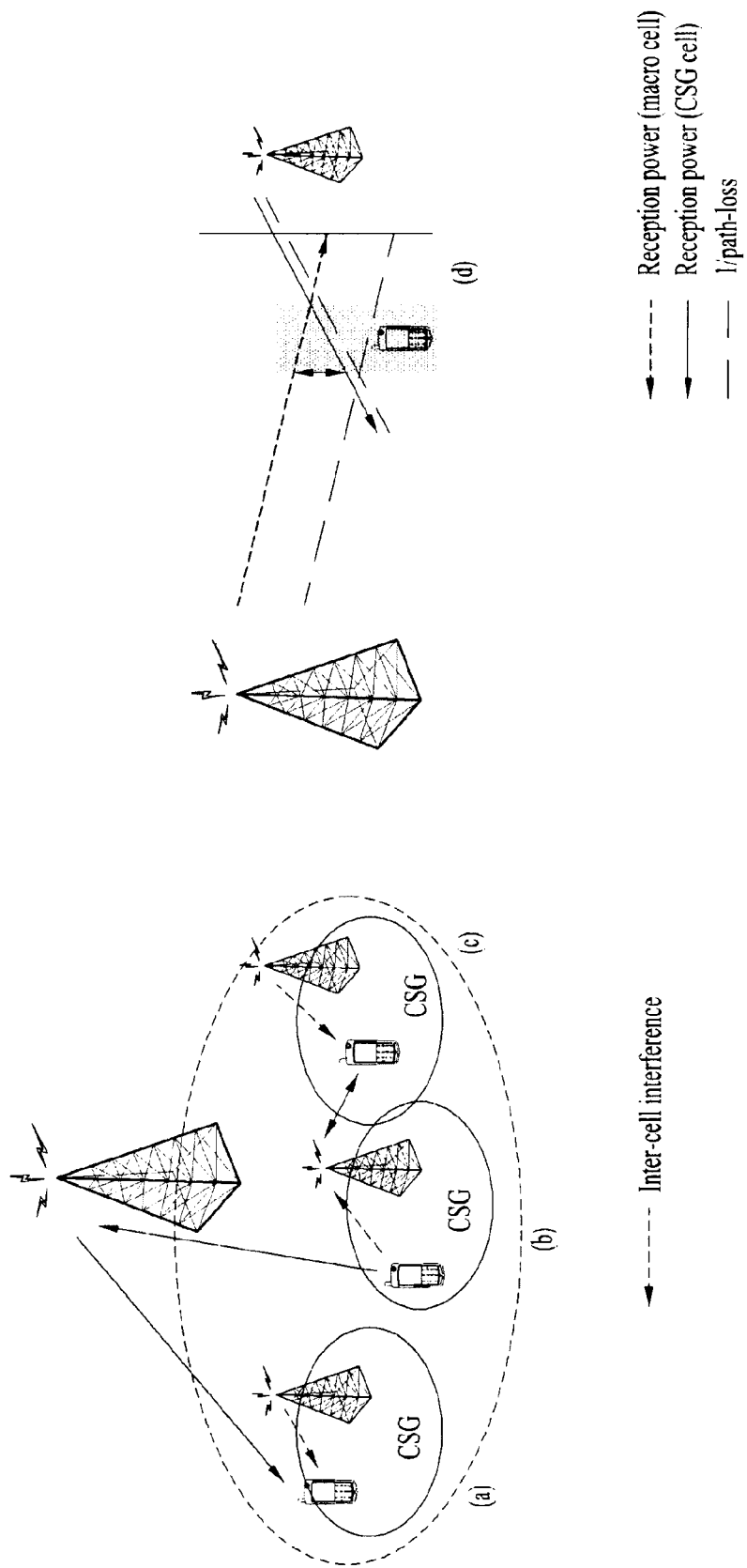
FIG. 8 is a diagram for one example of an interference possibly occurring in a heterogeneous network wireless communication system including a macro cell and a micro cell.

FIG. 8 is a diagram for one example of an interference possibly occurring in a heterogeneous network wireless communication system including a macro cell and a micro cell.

Referring to FIG. 8, a case (a) shows one example that a macro user equipment, for which an access to a CSG cell is not granted, experiences interference by an HeNB. A case (b) shows one example that a macro user equipment causes a severe interference toward the HeNB. A case (c) shows one example that a CSG user equipment experiences interference caused by another CSG cell. A case (d) shows one example that the increase of DL interference of a user equipment other than a macro user equipment on a cell boundary or edge is inevitable despite that an uplink may be improved owing to a path loss (e.g., a use of an inclining RSRP (reference signal received power) reporting) based on cell association.

This also implies that a method of handling an L1/L2 ($1^{st}$ layer/$2^{nd}$ layer) control signaling, a method of handling a synchronization signal and a method of handling a reference signal are important as well as UL/DL interference by which data is affected. These methods may work in time, frequency and/or space domain.

A macro-pico heterogeneous network or macro cell may cause a storing interference to a user equipment served by a pico cell, and more particularly, a user equipment located on an edge of a serving pico cell. A macro cell, which causes interference as a part of time-domain ICIC (inter-cell interference coordination), provides a subframe called an ABS (or ABSF: almost blank subframe) and can be protected against a strong interference attributed to a macro cell in a manner that any DL control channel or data channel is not transmitted in the ABSF except CRS. In case that PSS (Primary Synchronization Sequence), SSS (Secondary Synchronization Sequence), PBCH (Physical Broadcast Control Channel), SIB1 (System Information Block Type 1), Paging and PRS (Positioning Reference Signal match ABS, they are transmitted in the ABS. If ABS matches MBSFN (multicast broadcast single frequency network) subframe which does not transmit any signal in a data region, CRS is not transmitted in the data region of the ABS.

Figure 9:
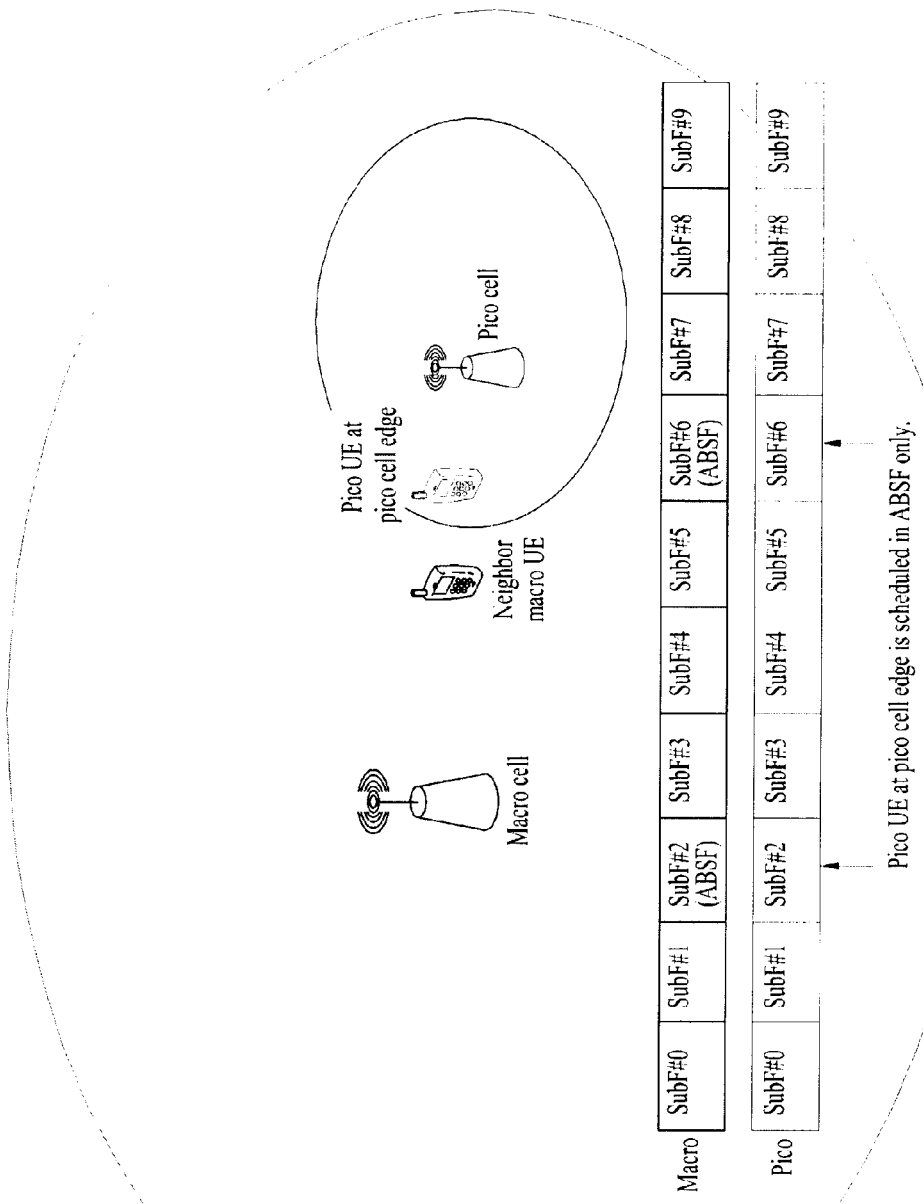
FIG. 9 is a diagram for one example of a configuration of ABS in a macro cell of a macro-pico network.

FIG. 9 is a diagram for one example of a configuration of ABS in a macro cell of a macro-pico network.

Referring to FIG. 9, a macro cell configures a subframe having an index #2 and a subframe having an index #6 with ABSF, and this information may be indicated to a pico cell via backhaul. The pico cell is able to schedule a pico user equipment (e.g., a user equipment served by the pico cell), and more particularly, user equipments on the boundary between the macro cell and the pico cell in ABSF only. In particular, the pico user equipment performs CSI measurement within ABSFs only.

A user equipment, which experiences interference, is configured to perform measurement for RLM/RRM (radio link monitoring/radio resource management) in subframe(s) restricted by a serving cell in order to prevent unnecessary radio link failure (RLF) and accurately perform measurements of a received power (RSRP: reference signal received power), a reference signal received quality (RSRQ) and the like. To this end, a bitmap signaling (e.g., ABS is indicated by '1' and other subframes may be indicated by '0'.) having the same period of a backhaul signaling may be applicable but should have a pattern configured independent from a backhaul bitmap pattern.

Since it is insufficient for ICIC technologies of the related art to overcome the co-channel interference, two kinds of scenarios (i.e., CSG scenario and pico scenario) have been proposed. These scenarios are examples of a network configuration to depict basic concept of time-domain ICIC and may be applicable to other network deployment scenarios.

Figure 10:
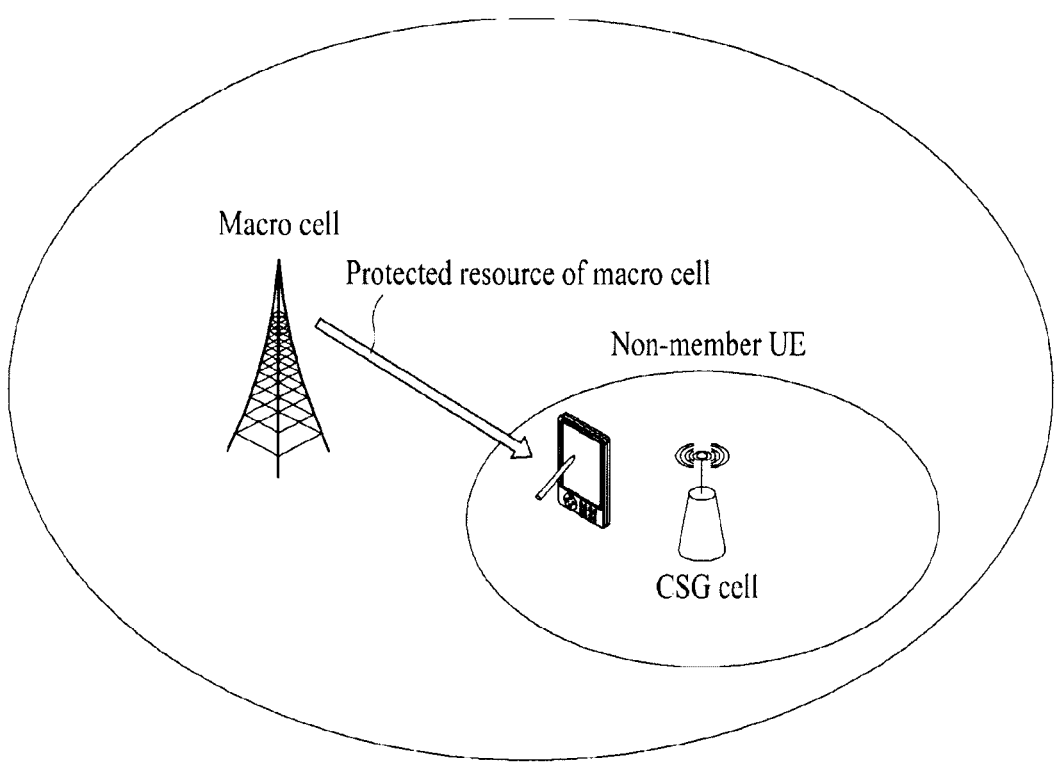
FIG. 10 is a diagram for one example of a CSG (closed subscriber group) scenario as a part of time-domain ICIC (inter-cell interference coordination)

FIG. 10 is a diagram for one example of a CSG (closed subscriber group) scenario as a part of time-domain ICIC (inter-cell interference coordination).

Referring to FIG. 10, if an access to a CSG cell is not granted to a user equipment, such a user equipment shall be named a non-member user equipment. When the non-member user equipment approaches close to a CSG cell, a major interference state may occur. Due to the network deployment and strategy, it may be impossible to divert a user equipment affected by an inter-cell interference to another E-UTRA (evolved-universal terrestrial radio access) carrier or another RAT (radio access technology) carrier. A time-domain ICIC may be usable to allow the non-member user equipment to receive a service from a macro cell on the same frequency layer.

Such interference may be reduced using ABSF in order for a CSG cell to protect a subframe of a corresponding macro cell from interference. The non-member user equipment may be signaled to use resources reserved for RRM for a serving cell, RLM and CSI measurements. And, the non-member user equipment may be allowed to keep receiving the service from the macro cell under the strong interference from the CSG cell.

In RRC-CONNECTED state, a network can observe that a non-member user equipment is related to a strong interference from a CSG cell via measurement events defined by LTE Release-8/9 for example. For this user equipment, the network may configure RRM/RLM/SCI measurement resource to be restricted. In order to facilitate mobility from a serving macro cell, the network may configure RRM measurement resource for a neighbor cell to be restricted. If the network detects that the user equipment does not receive the strong interference from the CSG cell any more, it may be able to cancel the restriction put on the RRM/RLM/CSI measurement resource.

Figure 11:
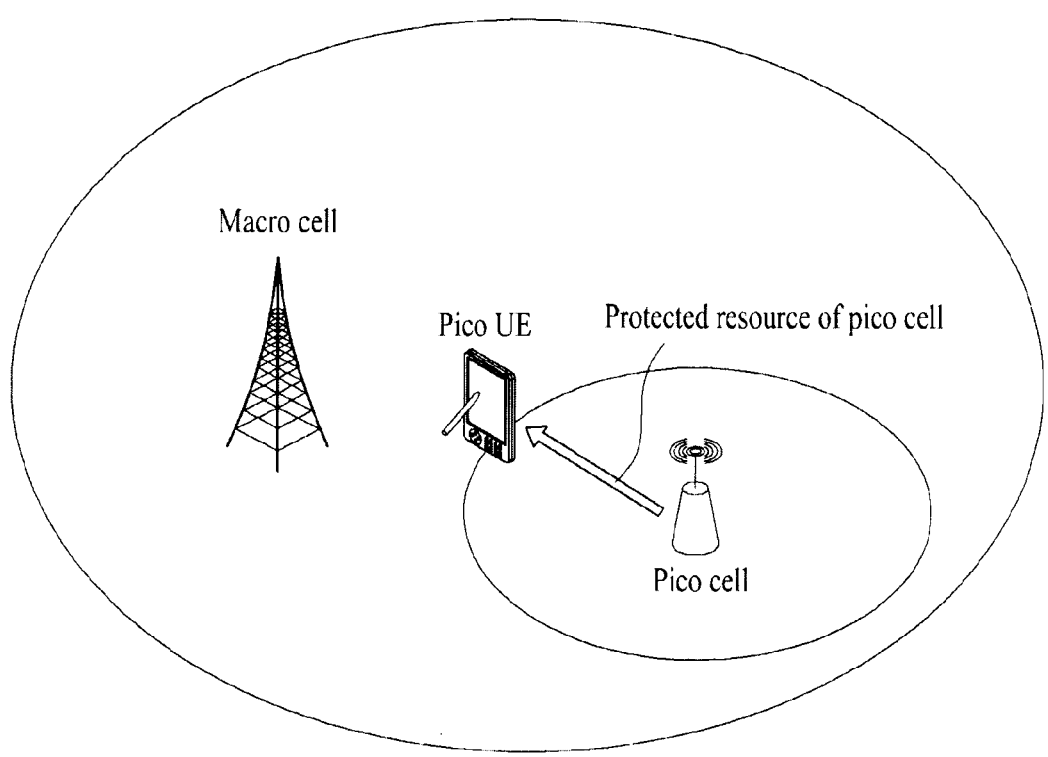
FIG. 11 is a diagram for one example of a pico scenario as a part of time-domain ICIC (inter-cell interference coordination)

FIG. 11 is a diagram for one example of a pico scenario as a part of time-domain ICIC (inter-cell interference coordination).

Referring to FIG. 11, a time-domain ICIC may be usable to a pico user equipment (e.g., a user equipment in the course of off-loading to a pico cell from a macro cell) located on an edge of a serving pico cell. The time-domain ICIC (inter-cell interference coordination) may be used to allow the above-user equipment to receive a service from the pico cell on the same frequency layer. This interference may be reduced in a manner that a macro cell uses ABSF to protect a subframe of a pico cell from the interference. The pico user equipment (e.g., a user equipment served by the pico cell) may be able to use the resources reserved for the cell measurement (RRM) for the serving pico cell, the RLM measurement and the CSI measurement. For the pico user equipment, the restriction put on the RRM/RLM/CSI measurement may enable more accurate measurement of the pico cell under the strong interference from the macro cell. The pico cell may be able to selectively configure the restriction of the RRM/RLM/CSI measurement resources only for the user equipments related to the strong interference from the macro cell. In order to facilitate the mobility to the pico cell from the macro cell for a user equipment serviced by the macro cell, the network may configure the restriction to be put on the RRM measurement resource for a neighbor cell.

In the following description, a method of delivering information on a subframe pattern (e.g., ABS pattern, etc.) between cells is explained in detail.

First of all, an interfering cell may be able to signal 2 bitmaps to an interfered cell via X2 interface. Each of the bitmaps may be configured to have 40-bit size and may be able to represent the attribute of each subframe by a unit of 40 subframes. The $1^{st}$ bitmap indicates a subframe having ABS situated therein. In particular, the $1^{st}$ bitmap may correspond to a bitmap that represents the ABS and other subframes as 1 and 0, respectively. The $2^{nd}$ bitmap may correspond to a bitmap indicating a subframe supposed to be set to the ABS of the $1^{st}$ bitmap in high probability. In particular, the subframe, which should be set to the ABS in the $2^{nd}$ bitmap, may correspond to a subset of the subframe set to the ABS in the $1^{st}$ bitmap. Such a subset may be used by a receiving state for the configuration of the restricted RLM/RRM measurement. A serving cell indicates actual resources for the RLM/RRM and CSI through RRC signaling.

In order to indicate an ABS pattern from a macro cell to a pico cell, a bitmap pattern is used. A period of a bitmap pattern in FDD system may be 40 ms, a period of a bitmap pattern in TDD system may be 20 ms in case of UL-DL configurations 1 to 5, a period of a bitmap pattern in TDD system may be 70 ms in case of UL-DL configuration 0, and a period of a bitmap pattern in TDD system may be 60 ms in case of UL-DL configuration 6.

The above-described bitmap pattern may be semi-statically updated. In doing so, an update trigger may occur aperiodically. And, the update trigger may occur on the basis of an event.

4.2. Scheduling Information Exchange Between Base Stations

In LTE/LTE-A system, as mentioned in the foregoing description, in order to reduce the interference between base stations, ABS (almost blank subframe) is assigned for the interference reduction of a data channel (e.g., PDSCH) to enable an interfered cell (i.e., a victim cell) to receive an interference-free signal.

Besides, using scheduling information between base stations, it may be able to orthogonally assign a frequency region having been assigned to each user equipment on a cell boundary.

Figure 12:
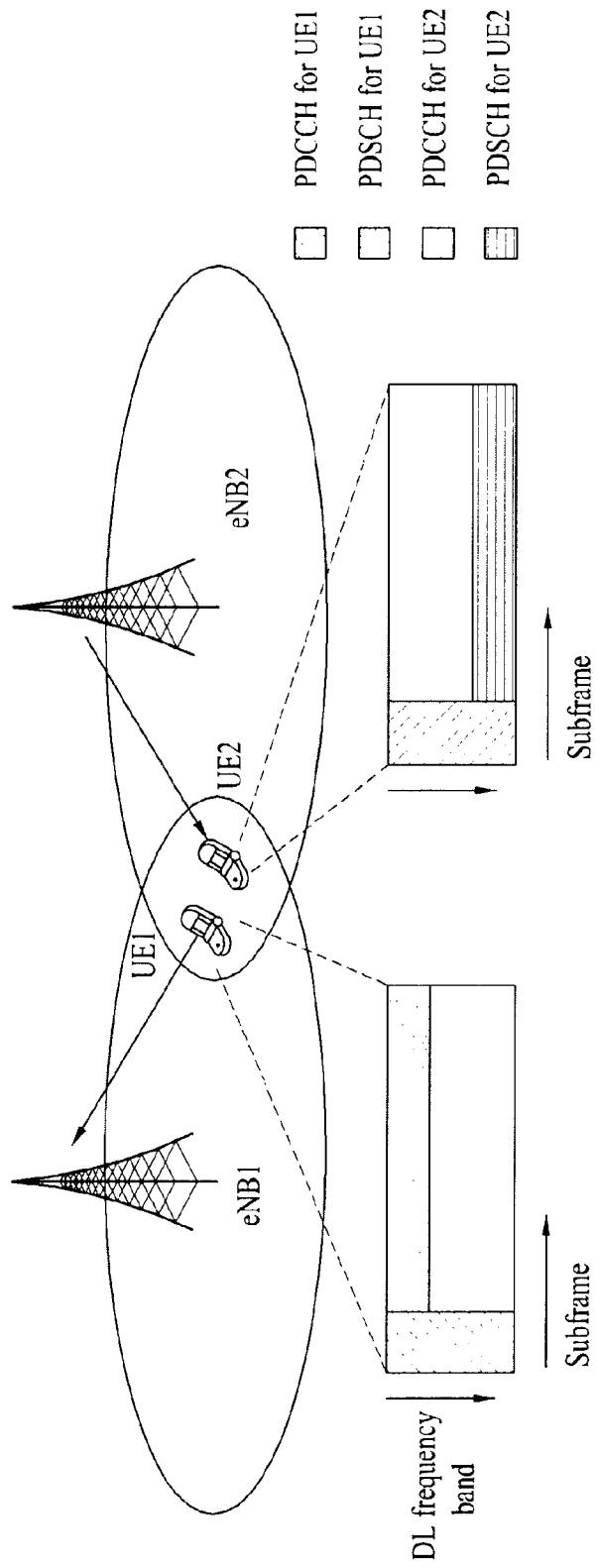
FIG. 12 is a diagram for one example of a scheme of reducing interference by exchanging scheduling information between base stations.

FIG. 12 is a diagram for one example of a scheme of reducing interference by exchanging scheduling information between base stations.

can be positioned within the single cell boundary. Due to an attribute (e.g., a refrigerator, a washing machine, a cellular phone, a TV, a notebook, and the like) of each of a plurality of the user equipments, interval of a data transmission and an amount of the data transmission can be configured in various forms. The aforementioned attribute of a plurality of the user equipments is categorized as follows in Table 11 in terms of implementing a user equipment and each of the user equipments can be designed according to the category.

Table 11 indicates performance of a user equipment required according to a category.

TABLE 11

| | | Downlink | | | | Uplink | | |
|---|---|---|---|---|---|---|---|---|
| UE category | Max. data rate (DL/UL) (Mbps) | Max. # DL-SCH TB bits/ TTI | Max. # DL-SCH bits/TB/ TTI | Total soft channel bits | Max. # spatial layers | Max. # UL SCH TB bits/TTI | Max. # UL-SCH bits/TB/ TTI | Support for 64 CLAM |
| Category 1 | 10/5 | 10296 | 10296 | 250308 | 1 | 5160 | 5160 | No |
| Category 2 | 50/25 | 51024 | 51024 | 1237248 | 2 | 25456 | 25456 | No |
| Category 3 | 100/50 | 102048 | 75376 | 1237248 | 2 | 51024 | 51024 | No |
| Category 4 | 150/50 | 150752 | 75376 | 1827072 | 2 | 51024 | 51024 | No |
| Category 5 | 300/75 | 299552 | 149776 | 3667200 | 4 | 75376 | 75376 | Yes |
| Category 6 | 300/50 | [299552] | [TBD] | [3667200] | * | [51024] | [TBD] | No |
| Category 7 | 300/150 | [299552] | [TBD] | [TBD] | * | [150752/102048 (Up to RAN4)] | [TBD] | Yes/No (Up to RAN4) |
| Category 8 | 1200/600 | [1200000] | [TBD] | [TBD] | * | [600000] | [TBD] | Yes |

Referring to FIG. 12, a base station 1 (i.e., eNB 1) transmits PDCCH and PDSCH to a user equipment 1 (i.e., UE 1), while a base station 2 (i.e., eNB 2) transmits PDCCH and PDSCH to a user equipment 2 (i.e., UE 2). In doing so, in a manner of exchanging scheduling information between the base stations eNB 1 and the eNB 2, the base station eNB 1/eNB 2 may be able to reduce the interference by assigning PDSCH to an orthogonal frequency region for the corresponding user equipment UE1/UE2. Yet, since the PDCCH for the user equipment UE 1/UE 2 is transmitted on a full DL frequency band, the interference may not be reduced despite of the scheme of exchanging the scheduling information between the base stations.

Moreover, interference may occur if base stations differ from each other in UL/DL configuration. As mentioned in the foregoing description, since the PDCCH transmitted to a user equipment is transmitted on a full DL frequency band, the PDCCH may be interfered by PUCCH or PUSCH transmitted by a different user equipment.

5. UL Data Scheduling Method

A machine-type communication (hereinafter abbreviated MTC) means that each of user equipments performs a communication with base station or a communication is performed between a plurality of user equipments. An MTC device indicates a device designed to perform a communication with an MTC server via a PLMN (public land mobile network) and/or a communication with a different MTC device(s) for the MTC. This sort of MTC device may perform a communication with a different entity providing raw data, which is necessary for the MTC device to communicate/process with the MTC server(s) and/or the different MTC device(s), in wireless (e.g., PAN (personal area network)) or hardwired.

Data transmission via the MTC is widely performed within a single cell boundary. A plurality of user equipments Referring to FIG. 1, UE category 1 is configured with UEs requiring a less data rate. These UEs does not support MIMO and can be designed with a low cost, since the UEs have a small buffer or a small memory in size in each of the UEs and use a simple algorithm. On the contrary, in case of a UE belonging to a category 8, since it requires a high data rate, a component of high price is necessary for the UE to support MIMO and be designed with a big buffer and a big memory in size.

According to a recent MTC, design cost reduction and complexity reduction are required in relation to a less data amount and/or a limited mobility and/or the aforementioned low cost device categories. These devices means devices capable of being implemented with a low complexity and a low cost compared to the aforementioned UE category 1. These devices are required to disseminate MTC and efficiently manage MTC.

Meanwhile, as mentioned in the foregoing description, a UE receives PDCCH and then performs a blind decoding to obtain DL control information. The blind decoding indicates channel decoding performed on all CCEs within PDCCH according to an aggregation level and detecting a DCI format transmitted to the UE by checking a CRC. And, the UE attempts the blind decoding on all DCI formats to be monitored.

In case of a system not supporting a carrier aggregation environment (non-CA based system), a UE performs 12 channel decoding in a common search space (CSS) and 32 channel decoding in a UE-specific search space (USS) in a single subframe to receive DL resource allocation (DL assignment) and UL resource allocation (UL grant) transmitted to the UE. And, in case of a system supporting the carrier aggregation environment (CA based system), a UE performs '44+(32×the number of DL SCCs)+(16×the number of UL MIMO CCs)' blind decoding in accordance with the number of DL secondary component carriers (SCC) and the number of UL component carriers (CC) in which UL MIMO is configured. Yet, in order to implement a low-cost device in MTC, it is important to reduce the number of performing the blind decoding.

According to the present invention, the number of performing the blind decoding can be reduced to implement an MTC device of a low cost. Moreover, the present invention proposes a scheme to solve a problem that a UE does not obtain reliable PDCCH due to interference capable of being occurred between homogeneous base stations or heterogeneous base stations.

5.1. UL Data Scheduling Method Using PDSCH (Physical Downlink Shared Channel)

Figure 13:
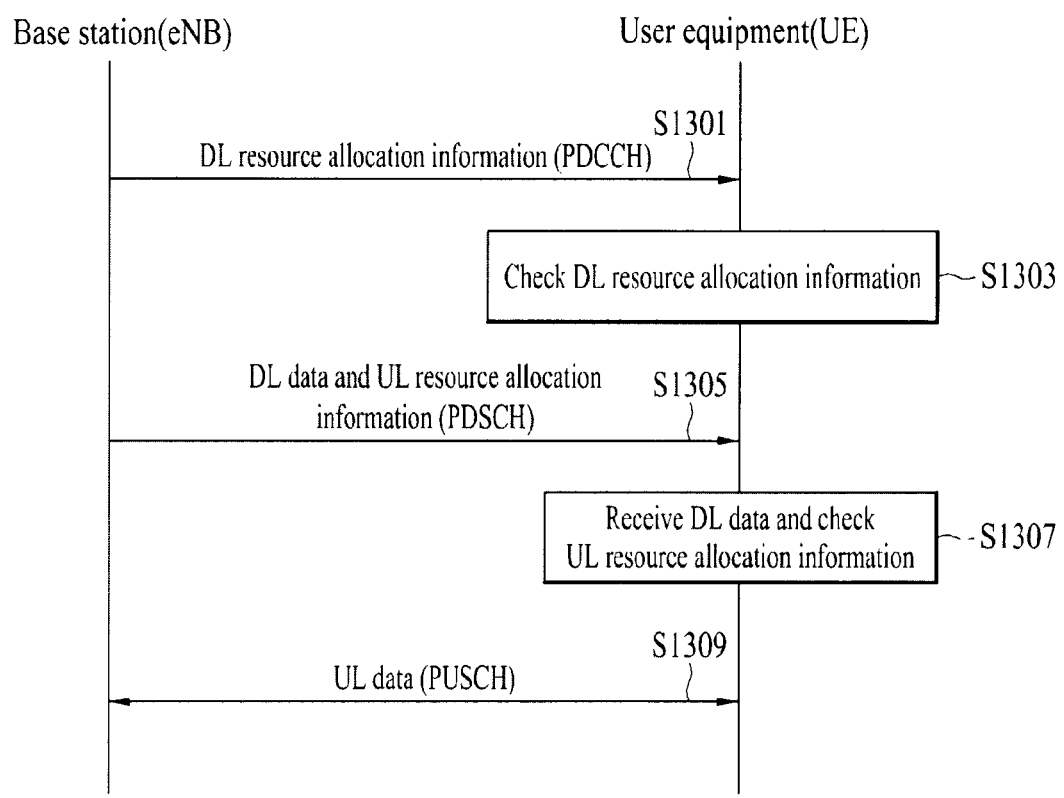
FIG. 13 is a flowchart for an uplink data scheduling method according to one embodiment of the present invention.

FIG. 13 is a flowchart for an uplink data scheduling method according to one embodiment of the present invention.

Referring to FIG. 13, a base station transmits DL resource allocation information (DL assignment) to a UE via PDCCH to schedule PDSCH [S1301]. In this case, the PDSCH includes UL resource allocation information (UL grant) to schedule PUSCH of the UE.

In this case, a cell to which PDCCH carrying the DL assignment is transmitted and a cell to which PDSCH carrying the UL grant is transmitted may be identical to each other or may be different from each other. If the cells are different from each other, the cell to which the PDCCH is transmitted becomes a P cell and the cell to which the PDSCH is transmitted becomes an S cell. Or, the cell to which both the PDCCH and the PDSCH are transmitted may become an S cell. In particular, a cross cell scheduling can be performed. And, a subframe to which the PDCCH carrying the DL assignment is transmitted and a subframe to which the PDSCH carrying the UL grant is transmitted may be different from each other. A DCI configuration to transmit the DL assignment and a position of the PDSCH, which is scheduled by the DL assignment, are explained in detail in the following (5.3.).

Having received PDCCH from a base station, a UE checks the DL assignment included in the PDCCH [S1303]. In this case, the DL grant transmitted by the base station may have a UL grant format. If the UE receives resource allocation information including the UL grant format under a specific condition, the UE determines it as a DL grant instead of the UL grant. A method for a base station to transmit a DL grant to schedule PDSCH including a UL grant or a method for a UE to check DL grant information received from a base station is explained in detail in the following (5.2.).

Subsequently, the base station transmits the PDSCH, which is scheduled by the DL assignment transmitted via PDCCH in the step S1301, to the UE [S1305]. In this case, as mentioned in the foregoing description, the PDSCH includes the UL grant to schedule PUSCH of the UE and the UE receives the UL grant together with the DL data scheduled by the DL assignment. In particular, the base station uses the PDSCH to transmit the UL grant.

Having received the UL grant and the PDSCH including the DL data from the base station, the UE checks the UL data included in the PDSCH [S1307] and transmits UL data to the base station via PUSCH according to the UL grant included in the PDSCH [S1309].

In case of transmitting and receiving UL resource allocation information in a manner of including the UL resource allocation information in the PDSCH between the base station and the UE, the DL data transmitted from the base station and the UL resource allocation information can be distinctively transmitted or can be transmitted in a manner of being joint coded. Regarding this, it shall be explained in detail later.

5.1.1. First Embodiment

Figure 14:
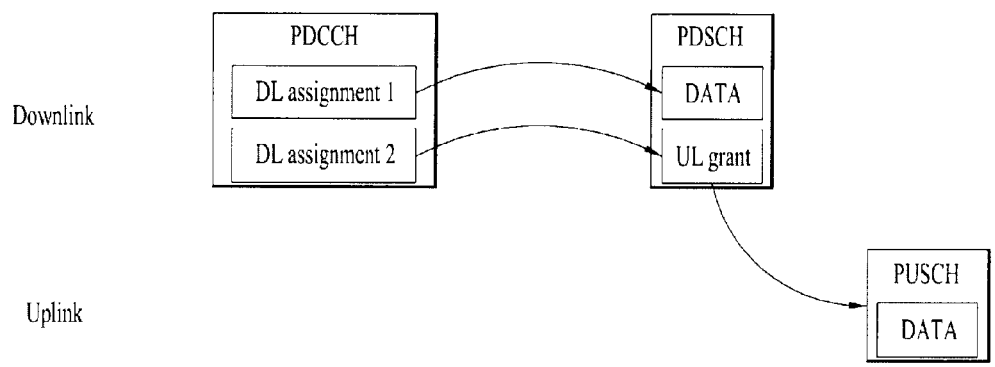
FIG. 14 is a conceptual diagram for a method of transmitting UL grant via PDSCH according to one embodiment of the present invention.

FIG. 14 is a conceptual diagram for a method of transmitting UL grant via PDSCH according to one embodiment of the present invention.

Referring to FIG. 14, a base station transmits UL resource allocation information (UL grant) to schedule PUSCH via PDSCH instead of PDCCH. To this end, the base station transmits DL resource allocation information (DL assignment) via PDCCH to schedule PDSCH carrying the UL grant. In particular, the base station transmits the UL grant in the PDSCH according to the DL assignment included in the PDCCH. In this case, the PDCCH includes a plurality of DL assignments transmitted to a corresponding UE and a part of the DL assignments can schedule the PDSCH carrying the UL grant. The remaining DL assignments schedule DL data transmitted via the PDSCH. In particular, each of the DL assignments schedules the DL data and the UL grant, respectively. FIG. 14 shows an example that a DL assignment 1 schedules the DL data transmitted via the PDSCH and a DL assignment 2 schedules the UL grant transmitted via the PDSCH. And, a UE receives the DL data and the UL grant via the PDSCH and transmits PUSCH to a base station according to the UL grant received via the PDSCH.

In order to indicate or trigger a UE to perform a scheme of transmitting the UL grant via the PDSCH, a base station can use an upper layer signaling (e.g., RRC signaling). The base station can configure the upper layer signaling UE-specifically or cell-specifically to reduce the number of blind decoding performed by UEs of a specific purpose, to consider a capacity of PDCCH, or to enhance reliability of a DCI by increasing CCE aggregation level of a different DCI format except the DL control information format related to the UL grant.

In case of transmitting the UL grant via the PDSCH, a coding scheme, a coding rate, or MCS (modulation and coding scheme) level is explained as follows.

1) A coding scheme, a coding rate, and a modulation order of the UL grant transmitted via PDCCH can be identically used. In particular, the UL grant transmitted via the PDSCH is modulated while identically maintaining the coding scheme, the coding rate, and the modulation order used in case of transmitting the UL grant via the PDCCH and may be then able to be mapped to a PDSCH region.

2) The PDSCH including the UL grant can be transmitted in a manner of being configured by a coding scheme or a coding rate of an MCS level within PDCCH of a subframe to which the corresponding UL grant (or PDSCH) is transmitted.

3) The PDSCH including the UL grant can be transmitted in a manner of being configured by a coding scheme or a coding rate of an MCS level within PDCCH of a DL subframe, which is most recently transmitted before the corresponding UL grant (or PDSCH) is transmitted.

4) The PDSCH including the UL grant can be transmitted in a manner of being configured by a coding scheme or a coding rate of an MCS level used for the UL grant, which is most recently transmitted before the corresponding UL grant is transmitted.

5.1.2. Second Embodiment

Figure 15:
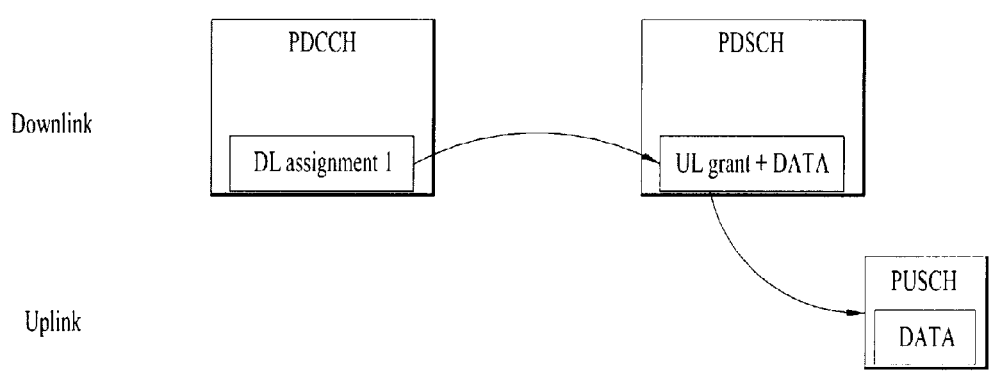
FIG. 15 is a conceptual diagram for a method of transmitting UL grant via PDSCH according to one embodiment of the present invention.

FIG. 15 is a conceptual diagram for a method of transmitting UL grant via PDSCH according to one embodiment of the present invention.

Referring to FIG. 15, a base station transmits UL resource allocation information (UL grant) to schedule PUSCH via PDSCH instead of PDCCH. To this end, the base station transmits DL resource allocation information (DL assignment) via PDCCH to schedule PDSCH carrying the UL grant. In particular, the base station transmits the UL grant in the PDSCH according to the DL assignment included in the PDCCH. In this case, if there exists DL data transmitted to the corresponding PDSCH, the UL grant transmitted via the PDSCH can be mapped to a PDSCH region in a manner of being joint-coded with the DL data. If there does not exist DL data transmitted to the corresponding PDSCH, the UL grant can be mapped to the PDSCH region. And, a UE receives the DL data and/or the UL grant via the PDSCH and transmits PUSCH to a base station according to the UL grant received via the PDSCH.

In order to indicate or trigger a UE to perform a scheme of transmitting the UL grant via the PDSCH, a base station can use an upper layer signaling (e.g., RRC signaling). The base station can configure the upper layer signaling UE-specifically or cell-specifically to reduce the number of blind decoding performed by UEs of a specific purpose, to consider a capacity of PDCCH, or to enhance reliability of a DCI by increasing CCE aggregation level of a different DCI format except the DL control information format related to the UL grant.

In case that the UL grant is joint-coded with DL data via the PDSCH, a coding scheme, a coding rate, or MCS (modulation and coding scheme) level is explained as follows.

1) The UL grant and the DL data joint-coded with each other are modulated while maintaining an MCS level of the PDSCH and may be then able to be mapped to a corresponding PDSCH region. In this case, the number of resource blocks (RB) or resource elements (RE) allocated to the UL grant and the DL data joint-coded with each other may increase due to the addition of the UL grant.

2) The MCS level applied to the UL grant and the DL data joint-coded with each other can be calculated again. In particular, if an RB (or RE) allocated to the UL grant and the DL data joint-coded with each other is transmitted to a DL data only in the corresponding PDSCH, the MCS level can be calculated again to make it identical to the number of RBs (or RE). Hence, although the UL grant is added, the number of RBs (or RE) can be maintained in a manner of being identical to a case that the DL data is transmitted only in the PDSCH.

5.2. PDCCH to Schedule PDSCH Including UL Grant

5.2.1. Downlink Control Information (DCI) Configuration

A PDCCH configured to schedule PDSCH including uplink resource allocation information (UL grant) can use a DCI format 1A or a modified DCI format 1A. In the following description, a DCI format within the PDCCH configured to schedule the PDSCH including a UL grant is called a virtual DCI format 1A. A method of configuring the virtual DCI format 1A is explained in detail.

Meanwhile, as mentioned in the foregoing description, when a cross cell scheduling is applied, if a plurality of cells are set to a UE, the PDCCH configured to schedule the PDSCH including the UL grant can include a carrier indicator field (CIF) to distinguish a cell transmitting the PDSCH from a plurality of the cells.

The virtual DCI format 1A used for the present invention can differently configure 1-bit flag in the virtual DCI format 1A from that of a DCI format 1A to distinguish the virtual DCI format 1A from the DCI format 1A configured to transmit a normal DL resource allocation information (DL assignment). For instance, the 1-bit flag of the virtual DCI format 1A may have a value of 0.

Specifically, the 1-bit flag of a legacy DCI format 0 or a DCI format 1A is used to distinguish the DCI format 1A from the DCI format 0. Since a flag of the virtual DCI format 1A in which the 1-bit flag used for the present invention is differently configured has a value of 0, it can be recognized by a UE as a DCI format 0 configured to transmit a UL grant. Yet, as mentioned in the foregoing description, if a scheme of transmitting the UL grant via PDSCH is configured by an upper layer and the like, the UE can recognize that the UL grant (PDCCH received by the DCI format 0) is used for a different usage. Consequently, if the UE receives the DCI format 0 in a specific subframe (subframe configured with the scheme of transmitting the UL grant via the PDSCH), this can be recognized as a DCI format of the proposed scheme.

In the following description, information transmitted via the virtual DCI format 1A is explained.

1) A carrier indicator—consists of 0 or 3 bits.

2) A flag to distinguish a DCI format 0 from a DCI format 1A—consists of 1 bit, the virtual DCI format 1A of the present invention has a value of 0.

3) A localized/distributed virtual resource block (VRB) assignment flag—consists of 1 bit.

4) Resource block assignment—bit number is determined by Formula 4 as follows.

$$\lceil \log_2(N_{RB}^{DL}(N_{RS}+1)/2) \rceil$$

In this case, in case of the localized virtual resource block, the number of bits for resource block assignment is determined by the aforementioned Formula 4.

In case of the distributed virtual resource block, if a DL resource block indicating a DL frequency band configuration is less than 50 ($N_{RB}^{DL}<50$) or if DCI format 1A CRC is scrambled to RA-RNTI (random access-RNTI), P-RNTI (paging-RNTI), or SI-RNTI (system information-RNTI), the number of bits for resource block assignment is determined by the aforementioned Formula 4.

On the contrary, in case of remaining cases, 1 bit, which corresponds to a MSB (most significant bit), indicates a gap value for dispersing in case of mapping a virtual resource block to a physical resource block. In this case, '0' indicates $N_{gap}=N_{gap,1}$ and '1' indicates $N_{gap}=N_{gap,2}$. And, the number of bits for resource block assignment is determined by Formula 5 as follows.

$$(\lceil \log_2(N_{RB}^{DL}(N_{RS}^{DL}+1)/2 \rceil -1) \qquad \text{[Formula 5]}$$

5) Modulation and coding scheme (MCS)—consists of 5 bits.

6) HARQ process number—consists of 3 bits and 4 bits in a FDD system and a TDD system, respectively.

7) New data indicator—consists of 1 bit.

The new data indicator may vary according to whether the virtual DCI format 1A CRC is scrambled to RA-RNTI, P-RNTI, or SI-RNTI.

In case that the virtual DCI format 1A CRC is scrambled to RA-RNTI, P-RNTI, or SI-RNTI, if a DL resource block is equal to 50 or greater than 50 ($N_{RB}^{DL} \geq 50$) and the localized/distributed virtual resource block assignment flag is set to 1, the new data indicator indicates a gap value. In this case, '0' indicates $N_{gap}=N_{gap,1}$ and '1' indicates $N_{gap}=N_{gap,2}$. Otherwise, the new data indicator is reserved.

On the contrary, if the virtual DCI format 1A CRC is not scrambled to RA-RNTI, P-RNTI, or SI-RNTI, the new data indicator can be configured in advance.

8) Redundancy version—consists of 2 bits.

9) Transmit power control (TPC) for PUCCH—consists of 2 bits.

In this case, in case that the virtual DCI format 1A CRC is scrambled to RA-RNTI, P-RNTI, or SI-RNTI, an MSB of a TPC command is reserved and a LSB (least significant bit) of the TPC command indicates a column according to a value of $N_{PRB}^{1.4}$ in a table indicating a transport block size. In this case, if the LSB is '0', $N_{PRB}^{1.4}$ corresponds to '2'. Otherwise, $N_{PRB}^{1.4}$ corresponds to '3'.

On the other hand, if the virtual DCI format 1A CRC is not scrambled to RA-RNTI, P-RNTI, or SI-RNTI, 2 bits including the MSB indicates the TPC command.

10) A DL assignment index—consists of 2 bits. In this case, although the DL assignment index exists in a TDD system for all DL/UL configurations, it is applicable to a TDD operation only including UL/DL configuration 1 to 6.

11) A sounding reference signal (SRS) request—consists of 0 or 1 bit.

Information bit in the aforementioned virtual DCI format 1A may belong to a prescribed one of a size set consisting of {12, 14, 16, 20, 24, 26, 32, 40, 44, and 56}. In this case, if the number of information bit in the virtual DCI format 1A is less than the number of information bit in the DCI format 0, '0' can be appended to the information bit in the virtual DCI format 1A until the number of information bit in the virtual DCI format 1A has a payload identical to that of the number of information bit in the DCI format 0. And, if the number of information bit in the virtual DCI format 1A belongs to a prescribed one of the aforementioned size set, a single 0 bit can be appended to the virtual DCI format 1A.

In case that the virtual DCI format 1A CRC is scrambled to RA-RNTI, P-RNTI, or SI-RNTI, a field for the HARQ process number and a field for the downlink assignment index can be reserved.

5.2.2 DL Subframe Indicated by Virtual DCI Format 1A

A position (or index) of a DL subframe indicated by a virtual DCI format 1A means a DL subframe capable of being transmitted a UL grant, which is a first (or preceding first) appearing UL grant after the virtual DCI format 1A is transmitted.

For instance, if a DL assignment is transmitted in an $n^{th}$ subframe in each radio frame from a base station using a virtual DCI format 1A, PDSCH scheduled by the virtual DCI format 1A can be transmitted in an n+k subframe. In particular, the base station transmits the PDSCH including UL grant in the n+k subframe. In this case, as mentioned in the foregoing description, if a cross cell scheduling is supported, a cell to which PDCCH including the virtual DCI format 1A is transmitted and a cell to which the PDSCH scheduled by the virtual DCI format 1A is transmitted may be different from each other. And, if it is applied to a TDD wireless access system, since UL-DL configuration varies according to a cell, a DL subframe indicated by the virtual DCI format 1A may correspond to a DL subframe firstly (or firstly preceding) appearing after the virtual DCI format 1A is transmitted based on the UL-DL configuration of the cell to which the PDSCH is transmitted.

5.3. Resource Mapping of PDSCH in which UL Grant is Included

Since a maximum bit of a DCI format including a UL grant is fixed according to a system bandwidth, the number of RBs (or RE) to which the UL grant is mapped can be fixed according to the maximum number of bits of the DCI format in which the UL grant is included. In this case, the maximum bits of the DCI format in which the UL grant is included may or may not include a CRC parity bit. Hence, the prescribed number of RBs (or, RE) can be assigned to transmit the UL grant according to a system bandwidth in a subframe in which PDSCH including the UL grant is transmitted and a UE can obtain the UL grant in a corresponding RB (or RE).

A position of the RB (or RE) occupied by the UL grant may correspond to a first part or a last part of an RB (or RE) occupied by data.

Figure 16:
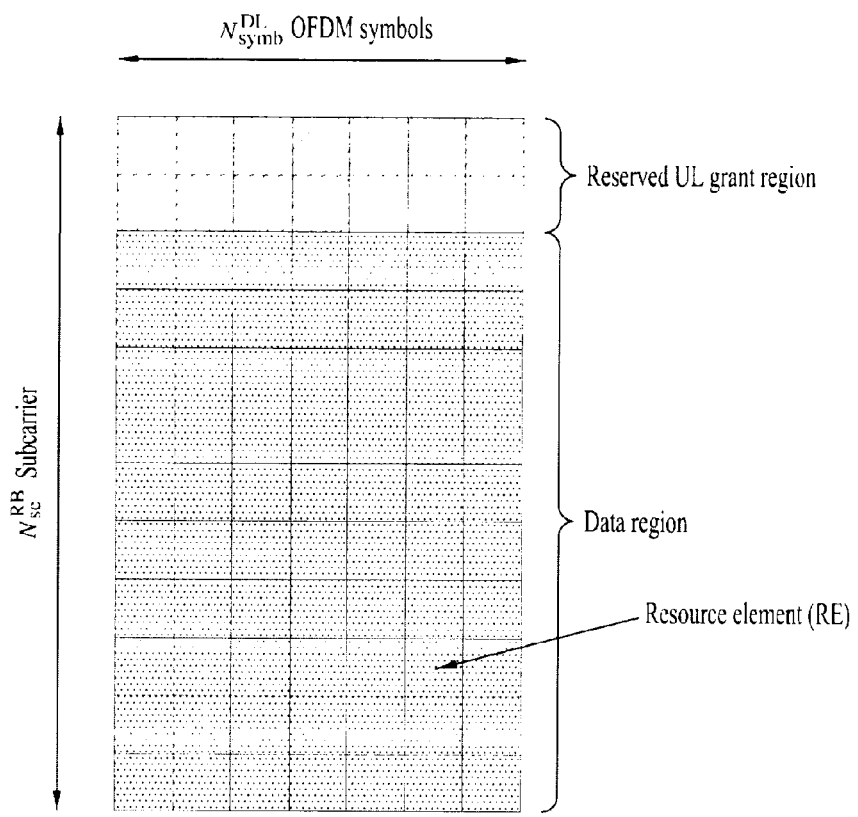
FIG. 16 is a diagram for an example of a resource mapping of UL grant and data when the UL grant is transmitted via PDSCH according to one embodiment of the present invention.

FIG. 16 is a diagram for an example of a resource mapping of UL grant and data when the UL grant is transmitted via PDSCH according to one embodiment of the present invention.

Referring to FIG. 16, a prescribed region within PDSCH, i.e., a first part of RE (RE belonging to a first and second subcarrier) occupied by data indicates an example of a region configured as a UL grant region. In this case, it can be identically applicable to a case that a resource allocation unit is configured by an RB.

And, a base station can semi-statically configure a UL grant region transmitted within PDSCH via an RRC signaling. Hence, a UE can obtain a UL grant within the PDSCH using information on the UL grant region received via the RRC signaling.

If the aforementioned scheme of transmitting a UL grant via PDSCH is used, following advantages may be obtained.

Since the UL grant is transmitted via the PDSCH, a base station can transmit the less number of DCI formats, which are to be transmitted via PDCCH, to UEs. Hence, DL assignment or DCI formats for a power control can be transmitted in a manner of being configured with a higher CCE aggregation level. This means that more reliable PDCCH can be transmitted to UEs. In particular, in case of not properly decoding PDCCH due to interference, a UE can decode more reliable PDCCH if the PDCCH is transmitted with a higher CCE aggregation level. Moreover, if the CCE aggregation level is not increased, since there may remain extra CCEs as much as the number of CCEs capable of transmitting UL grant, control information can be transmitted to more UEs. Hence, capacity of PDCCH can be increased in an MTC based system taking into account considerable numbers of UEs or such a cellular system as a hot zone.

6. The General of Device for Implementing the Present Invention

Figure 17:
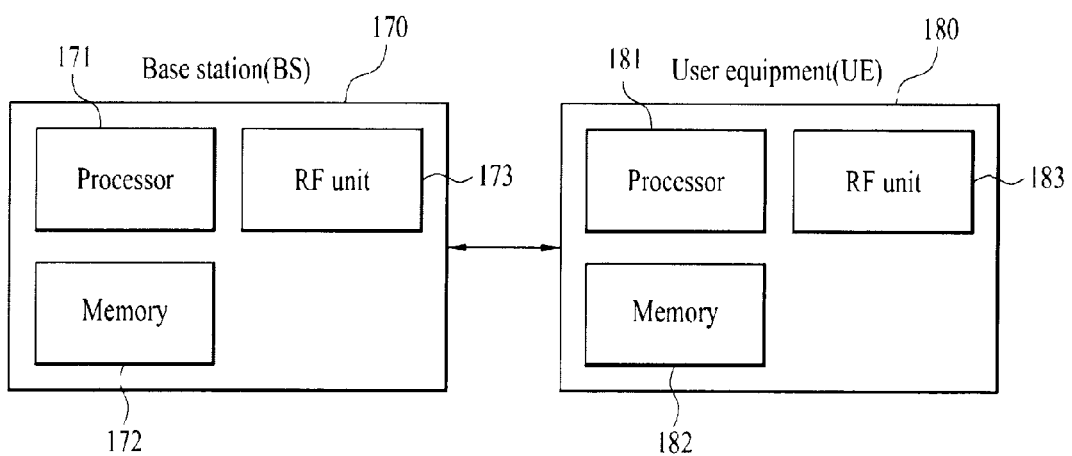
FIG. 17 is a block diagram for a configuration of a wireless communication device according to one embodiment of the present invention.

FIG. 17 is a block diagram for a configuration of a wireless communication device according to one embodiment of the present invention.

Referring to FIG. 17, a wireless communication system includes a base station 170 and a plurality of user equipments 180 positioned within a region of the base station 170.

The base station 170 includes a processor 171, a memory 172, and a RF (radio frequency) unit 173. The processor 171 is configured to implement a proposed function, a procedure and/or a method. Layers of a radio interface protocol can be implemented by the processor 171. The memory 172 is connected with the processor 171 and stores various informations to drive the processor 171. The RF unit 173 is connected with the processor 171 and is configured to transmit/receive a radio signal.

The user equipment 180 includes a processor 181, a memory 182, and a RF (radio frequency) unit 183. The processor 181 is configured to implement a proposed function, a procedure and/or a method. Layers of a radio interface protocol can be implemented by the processor 181. The memory 182 is connected with the processor 181 and stores various informations to drive the processor 181. The RF unit 183 is connected with the processor 181 and is configured to transmit/receive a radio signal.

The memory 172/182 can be positioned at an inside or an outside of the processor 171/181 and can be connected to the processor 171/181 with a well-known means. And, the base station 170 and/or the user equipment 180 may have a single antenna or multiple antennas.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the means well-known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

Although a method of transmitting/receiving data in a wireless access system according to the present invention and apparatus therefor are described with reference to examples applied to 3GPP LTE system, it may be applicable to various kinds of wireless communication systems as well as the 3GPP LTE system.

What is claimed is:

1. A method of transmitting and receiving data by a user equipment in a wireless communication system, comprising:
receiving, by the user equipment, an indication message from a base station through a higher layer, the indication message indicating that uplink resource allocation information is transmitted via a physical downlink shared channel (PDSCH);
receiving, by the user equipment, first downlink resource allocation information from the base station via a physical downlink control channel (PDCCH), the first downlink resource allocation information including a flag indicating whether the first downlink resource allocation information is used as an uplink grant or a downlink grant;
receiving, by the user equipment, the uplink resource allocation information from the base station via the PDSCH scheduled by the first downlink resource allocation information based on the indication message, when the flag included in the first downlink resource allocation information indicates that the first downlink resource allocation information is used as the uplink grant and transmitting, by the user equipment, uplink data to the base station via a physical uplink shared channel (PUSCH) scheduled by the uplink resource allocation information; and
receiving, by the user equipment, downlink data from the base station via the PDSCH scheduled by the first downlink resource allocation information, when the flag included in the first downlink resource allocation information indicates that the first downlink resource allocation information is used as the downlink grant.

2. The method of claim 1, wherein when second downlink resource allocation information is received from the base station via the PDCCH together with the first downlink resource allocation information, downlink data scheduled by the second downlink resource allocation information is received via the PDSCH together with the uplink resource allocation information.

3. The method of claim 1, wherein a modulation and coding scheme (MCS) level used for the uplink resource allocation information is identical to an MCS level used for a case of transmitting the uplink resource allocation information via the PDCCH.

4. The method of claim 1, wherein a modulation and coding scheme (MCS) level used for the PDSCH containing the uplink resource allocation information is identical to an MCS level used for the PDCCH of a subframe in which the PDSCH is transmitted.

5. The method of claim 1, wherein a modulation and coding scheme (MCS) level used for the PDSCH containing the uplink resource allocation information is identical to an MCS level used for a most recently transmitted PDCCH before the PDSCH is transmitted.

6. The method of claim 1, wherein a modulation and coding scheme (MCS) level used for the PDSCH containing the uplink resource allocation information is identical to an MCS level used for a most recently transmitted uplink resource allocation information before the PDSCH is transmitted.

7. The method of claim 1, wherein a subframe in which the PDSCH is transmitted corresponds to a firstly appearing subframe after a subframe in which the PDCCH is transmitted.

8. The method of claim 1, wherein the number of resources to which the uplink resource allocation information is mapped or a position of a resource region is predetermined or configured by a higher layer signaling.

9. A user equipment that transmits and receives data in a wireless communication system, comprising:
a radio frequency (RF) unit that transmits and receives a radio signal; and
a processor that controls the RF unit to:
receive an indication message from a base station through a higher layer, the indication message indicating that uplink resource allocation information is transmitted via a physical downlink shared channel (PDSCH),
receive first downlink resource allocation information from the base station via a physical downlink control channel (PDCCH), the first downlink resource allocation information including a flag indicating whether the first downlink resource allocation information is used as an uplink grant or a downlink grant,
receive the uplink resource allocation information from the base station via the PDSCH scheduled by the first downlink resource allocation information based on the indication message, when the flag included in the first downlink resource allocation information indicates that the first downlink resource allocation information is used as the uplink grant, and transmit uplink data to the base station via a physical uplink shared channel (PUSCH) scheduled by the uplink resource allocation information, and
receive downlink data from the base station via the PDSCH scheduled by the first downlink resource allocation information, when the flag included in the first downlink resource allocation information indicates that the first downlink resource allocation information is used as the downlink grant.

10. The user equipment of claim 9, wherein when second downlink resource allocation information is received from the base station via the PDCCH together with the first downlink resource allocation information, downlink data scheduled by the second downlink resource allocation information is received via the PDSCH together with the uplink resource allocation information.

11. The user equipment of claim 9, wherein a modulation and coding scheme (MCS) level used for the uplink resource allocation information is identical to an MCS level used for a case of transmitting the uplink resource allocation information via the PDCCH.

12. The user equipment of claim 9, wherein a modulation and coding scheme (MCS) level used for the PDSCH containing the uplink resource allocation information is identical to an MCS level used for the PDCCH of a subframe in which the PDSCH is transmitted.

13. The user equipment of claim 9, wherein a modulation and coding scheme (MCS) level used for the PDSCH containing the uplink resource allocation information is identical to an MCS level used for a most recently transmitted PDCCH before the PDSCH is transmitted.

14. The user equipment of claim 9, wherein a modulation and coding scheme (MCS) level used for the PDSCH containing the uplink resource allocation information is identical to an MCS level used for a most recently transmitted uplink resource allocation information before the PDSCH is transmitted.

15. The user equipment of claim 9, wherein a subframe in which the PDSCH is transmitted corresponds to a firstly appearing subframe after a subframe in which the PDCCH is transmitted.

16. The user equipment of claim 9, wherein the number of resources to which the uplink resource allocation information is mapped or a position of a resource region is predetermined or configured by a higher layer signaling.

* * * * *